US011395012B2

(12) United States Patent
Kanoh et al.

(10) Patent No.: US 11,395,012 B2
(45) Date of Patent: Jul. 19, 2022

(54) ENCODER, DECODER, ENCODING METHOD, AND DECODING METHOD OF PARTITIONING A PICTURE USING SELECTIVE PARTITION MODE

(71) Applicant: Panasonic Intellectual Property Corporation of America, Torrance, CA (US)

(72) Inventors: Ryuichi Kanoh, Osaka (JP); Kiyofumi Abe, Osaka (JP); Takahiro Nishi, Nara (JP); Tadamasa Toma, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/874,037

(22) Filed: May 14, 2020

(65) Prior Publication Data
US 2020/0275132 A1    Aug. 27, 2020

Related U.S. Application Data

(63) Continuation of application No. PCT/JP2018/041794, filed on Nov. 12, 2018.
(Continued)

(51) Int. Cl.
*H04N 11/02*     (2006.01)
*H04N 19/96*     (2014.01)
(Continued)

(52) U.S. Cl.
CPC .......... *H04N 19/96* (2014.11); *H04N 19/124* (2014.11); *H04N 19/159* (2014.11);
(Continued)

(58) Field of Classification Search
CPC ...................................................... H04N 19/96
(Continued)

(56) References Cited

U.S. PATENT DOCUMENTS 10,404,988 B2 *   9/2019   Ye ........................... H04N 19/96
10,721,492 B2 *   7/2020   Son ....................... H04N 19/196
(Continued)

FOREIGN PATENT DOCUMENTS

| JP | 2013-509788 A | 3/2013 |
|----|---------------|--------|
| WO | 2011/053050 A2 | 5/2011 |
| WO | 2018/070550 A1 | 4/2018 |

OTHER PUBLICATIONS

International Search Report and Written Opinion, dated Dec. 18, 2018, which corresponds to International Application No. PCT/JP2018/041794, 12 pages.
(Continued)

*Primary Examiner* — Leron Beck
(74) *Attorney, Agent, or Firm* — Seed IP Law Group LLP

(57) ABSTRACT

An encoder (100) that encodes an image on a per block basis includes circuitry and memory. Using the memory, the circuitry: performs first partitioning of dividing the image using a square block having a fixed block size, to generate the image into a plurality of blocks including the square block which has the fixed block size and a first non-square block which has a size smaller than the fixed block size; performs second partitioning on the plurality of blocks; adds information on the second partitioning into a bitstream; and prohibits a quad tree splitting of the first non-square block in the second partitioning.

20 Claims, 29 Drawing Sheets

Related U.S. Application Data

(60) Provisional application No. 62/587,115, filed on Nov. 16, 2017.

(51) Int. Cl.
| | | |
|---|---|---|
| *H04N 19/124* | (2014.01) | |
| *H04N 19/159* | (2014.01) | |
| *H04N 19/176* | (2014.01) | |
| *H04N 19/18* | (2014.01) | |
| *H04N 19/66* | (2014.01) | |
| *H04N 19/91* | (2014.01) | |

(52) U.S. Cl.
CPC .......... *H04N 19/176* (2014.11); *H04N 19/18* (2014.11); *H04N 19/66* (2014.11); *H04N 19/91* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 2011/0103701 A1* | 5/2011 | Cheon | ................. | H04N 19/395 |
| | | | | 382/233 |
| 2013/0266074 A1* | 10/2013 | Guo | ..................... | H04N 19/159 |
| | | | | 375/240.24 |
| 2014/0003532 A1* | 1/2014 | Coban | ................. | H04N 19/463 |
| | | | | 375/240.24 |
| 2016/0165246 A1* | 6/2016 | Nagumo | ............. | H04N 19/553 |
| | | | | 375/240.25 |
| 2017/0006309 A1* | 1/2017 | Liu | ...................... | H04N 19/597 |
| 2018/0109812 A1 | 4/2018 | Tsai et al. | | |
| 2019/0246106 A1 | 8/2019 | Park et al. | | |
| 2019/0253710 A1* | 8/2019 | Ryu | ..................... | H04N 19/176 |

OTHER PUBLICATIONS

H.265 (ISO/IEC 23008-2 HEVC (High Efficiency Video Coding) "Information technology—High efficiency coding and media delivery in heterogeneous environments—Part 2: High efficiency video coding," International Standard, First Edition, Dec. 1, 2013, 312 pages.

Yang et al., "CTB splitting on frame boundary for arbitrary resolution video," Document: JCTVC-C025, Joint Collaborative Team on Video Coding (JCT-VC) of ITU-T SG16 WP3 and ISO/IEC JTC1/SC29/WG11, 3$^{rd}$ Meeting, Guangzhou, CN, Oct. 7-15, 2010, 5 pages.

Japanese Office Action, dated Jun. 8, 2021, for Japanese Application No. 2019-554203, 7 pages.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

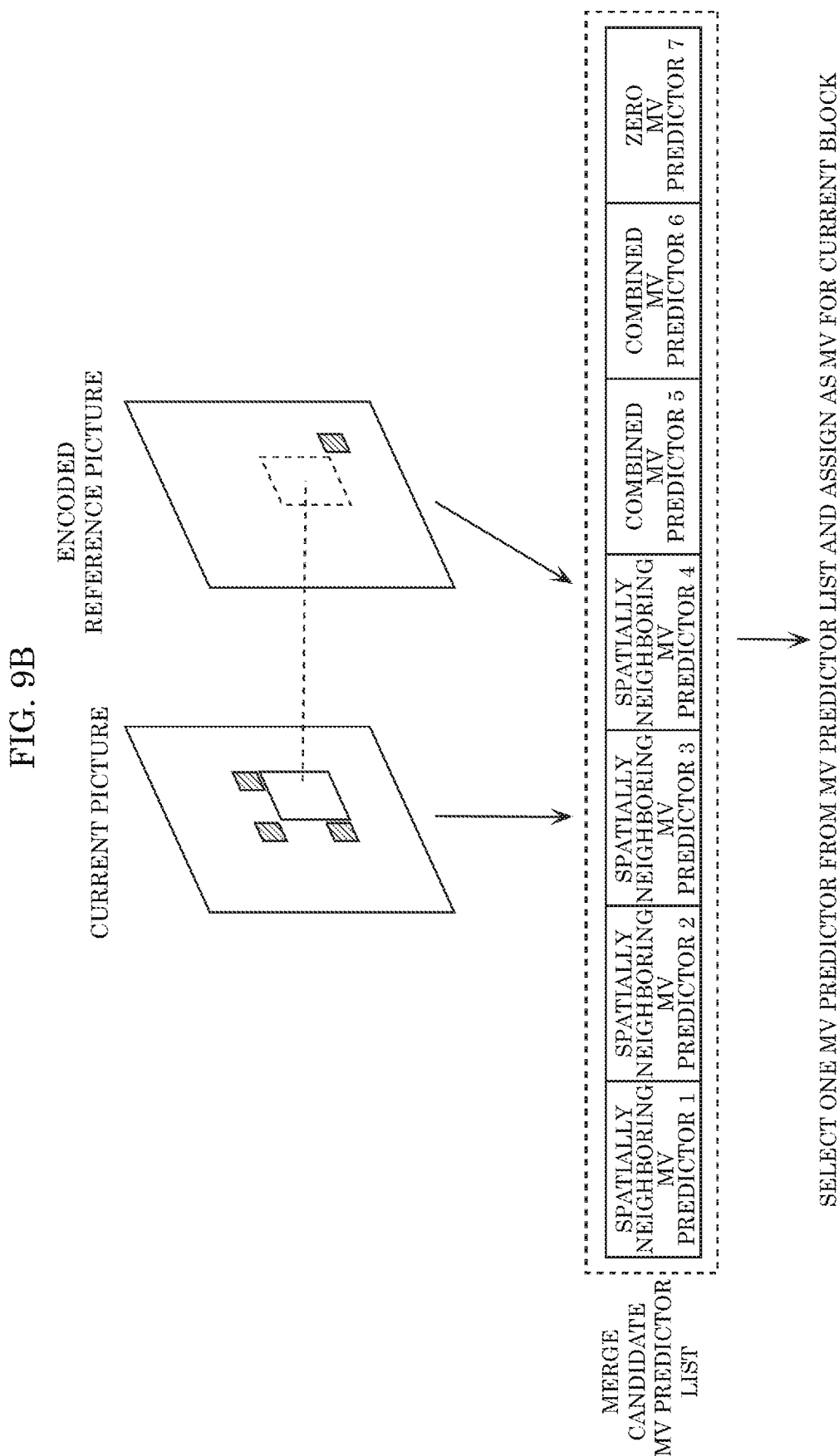

ENCODER, DECODER, ENCODING METHOD, AND DECODING METHOD OF PARTITIONING A PICTURE USING SELECTIVE PARTITION MODE

TECHNICAL FIELD

The present disclosure relates to an encoder, a decoder, an encoding method, and a decoding method.

BACKGROUND ART

The video coding standards known as High-Efficiency Video Coding (HEVC) is standardized by the Joint Collaborative Team on Video Coding (JCT-VC).

CITATION LIST

Non-Patent Literature

NPL 1: H.265 (ISO/IEC 23008-2 HEVC (High Efficiency Video Coding))

SUMMARY OF THE INVENTION

Technical Problem

In such encoding and decoding techniques, further improvement is desired.

In view of this, the present disclosure provides an encoder, a decoder, an encoding method, and a decoding method capable of realizing further improvement.

Solutions to Problem

According to one aspect, an image decoder is provided including circuitry and a memory coupled to the circuitry. The circuitry, in operation, performs a first partitioning including using a first partition mode, without parsing first splitting information indicative of the first partition mode, to split a first block into a plurality of second blocks, wherein the first block is one of a plurality of first blocks split from a picture. The circuitry, in operation, performs a second partitioning on a second block, which is one of the plurality of second blocks, by parsing second splitting information indicative of a second partition mode and using the second partition mode to split the second block into a plurality of coding units (CUs). In the second partitioning, the second partition mode prohibits a quad tree splitting of the second block in response to that the second block is located adjacent to an edge of the picture and that dimensions of the second block satisfy a second condition. The circuitry, in operation, decodes the plurality of CUs.

According to another aspect, the circuitry uses the first partition mode to split the first block in response to a first condition being satisfied. For example, the circuitry uses the first partition mode to split the first block in response to that the first block is located adjacent to an edge of the picture or that the first block has a rectangular shape.

According to another aspect, a decoding method is provided including generally three steps.

First, the method performs a first partitioning including using a first partition mode, without parsing first splitting information indicative of the first partition mode, to split a first block into a plurality of second blocks, wherein the first block is one of a plurality of first blocks split from a picture.

Second, the method performs a second partitioning on a second block, which is one of the plurality of second block, by parsing second splitting information indicative of a second partition mode and using the second partition mode to split the second block into a plurality of coding units (CUs). In the second partitioning, the second partition mode prohibits a quad tree splitting of the second block in response to that the second block is located adjacent to an edge of the picture and that dimensions of the second block satisfy a second condition.

Third, the method decodes the plurality of CUs.

According to a further aspect, an encoder is provided that encodes an image on a per block basis and includes circuitry and a memory. Using the memory, the circuitry performs a first partitioning of dividing the image using a square block having a fixed block size, to partition the image into a plurality of blocks including a square block which has the fixed block size and a first non-square block which has a size smaller than the fixed block size. The circuitry performs a second partitioning on the plurality of blocks. The circuitry adds information on the second partitioning into a bitstream, and prohibits a quadtree splitting of the first non-square block in the second partitioning.

According to a still further aspect, a decoder is provided that decodes, on a per block basis, an image that is encoded, and includes circuitry and a memory. Using the memory, the circuitry performs a first partitioning of dividing the image using a square block having a fixed block size, to generate a plurality of blocks including a square block which has the fixed block size and a first non-square block which has a size smaller than the fixed block size The circuitry obtains information on a second partitioning; performs the second partitioning, which is recursive, on the plurality of blocks based on the information on the second partitioning; and prohibits a quadtree splitting of the first non-square block in the second partitioning.

General or specific aspects of the present disclosure may be realized as a system, method, integrated circuit, computer program, computer-readable medium such as a CD-ROM, or any combination thereof.

Advantageous Effect of Invention

The present disclosure provides an encoder, a decoder, an encoding method, and a decoding method capable of realizing further improvement.

BRIEF DESCRIPTION OF DRAWINGS

These and other objects, advantages and features of the disclosure will become apparent from the following description taken in conjunction with the accompanying drawings that illustrate embodiments of the present disclosure.

FIG. 3 is a chart indicating transform basis functions for each transform type.

FIG. 9B is a conceptual diagram for illustrating one example of deriving a motion vector using a merge mode.

DESCRIPTION OF EXEMPLARY EMBODIMENTS

Figure 1:
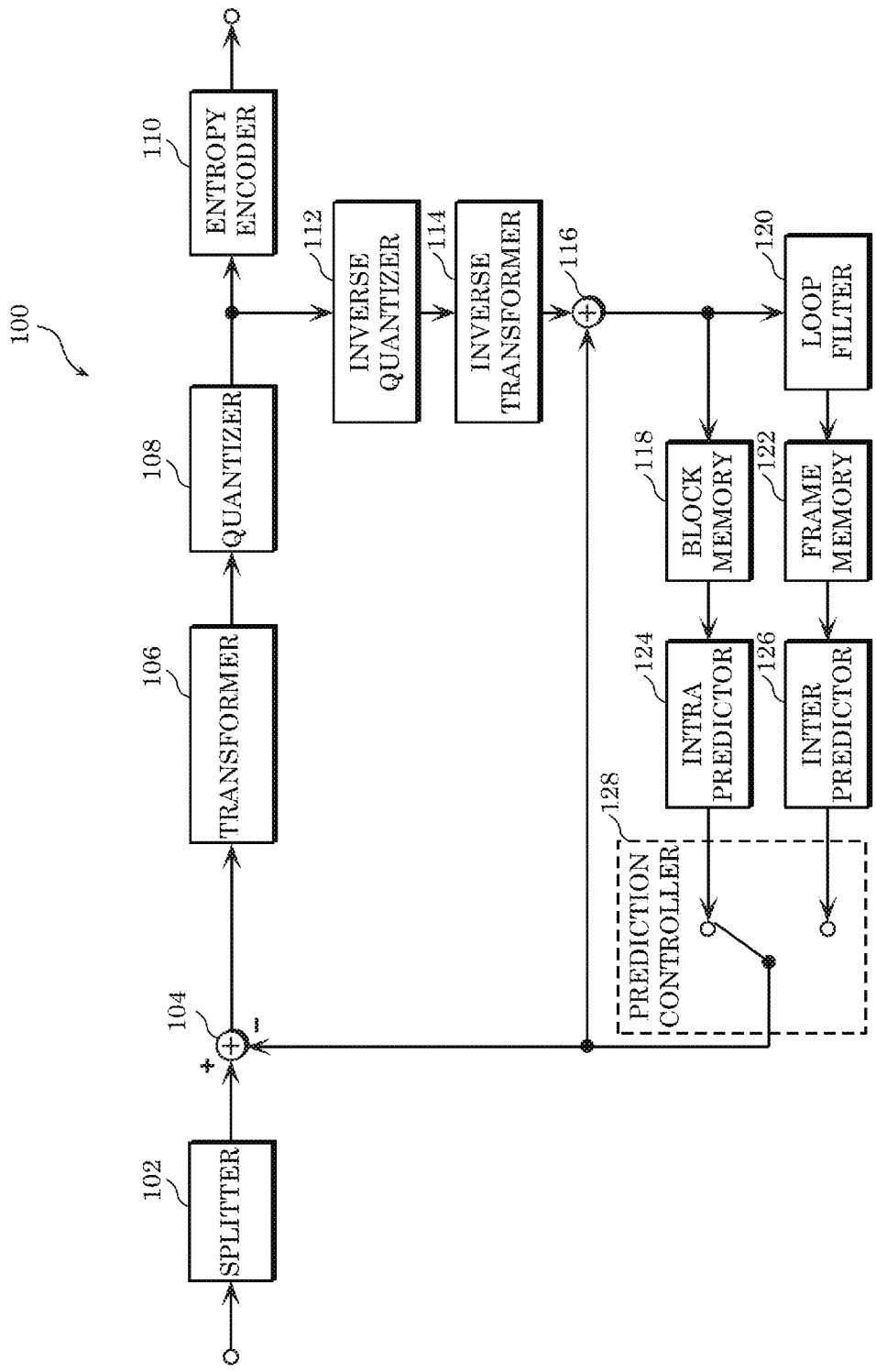
FIG. 1 is a block diagram illustrating a functional configuration of an encoder according to Embodiment 1.

Hereinafter, embodiments will be described with reference to the drawings.

Note that the embodiments described below each show a general or specific example. The numerical values, shapes, materials, components, the arrangements and connections of the components, steps, order of the steps, etc. that are indicated in the following embodiments are mere examples, and therefore are not intended to limit the scope of the claims.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be implemented.

(1) Any of the components of the encoder or the decoder according to the embodiments presented in the description of aspects of the present disclosure may be substituted or combined with another component presented anywhere in the description of aspects of the present disclosure.

(2) In the encoder or the decoder according to the embodiments, discretionary changes may be made to functions or processes performed by one or more components of the encoder or the decoder, such as addition, substitution, removal, etc., of the functions or processes. For example, any function or process may be substituted or combined with another function or process presented anywhere in the description of aspects of the present disclosure.

(3) In methods implemented by the encoder or the decoder according to the embodiments, discretionary changes may be made such as addition, substitution, and removal of one or more of the processes included in the method. For example, any process in the method may be substituted or combined with another process presented anywhere in the description of aspects of the present disclosure.

(4) One or more components included in the encoder or the decoder according to embodiments may be combined with a component presented anywhere in the description of aspects of the present disclosure, may be combined with a component including one or more functions presented anywhere in the description of aspects of the present disclosure, and may be combined with a component that implements one or more processes implemented by a component presented in the description of aspects of the present disclosure.

(5) A component including one or more functions of the encoder or the decoder according to the embodiments, or a component that implements one or more processes of the encoder or the decoder according to the embodiments, may be combined or substituted with a component presented anywhere in the description of aspects of the present disclosure, with a component including one or more functions presented anywhere in the description of aspects of the present disclosure, or with a component that implements one or more processes presented anywhere in the description of aspects of the present disclosure.

(6) In methods implemented by the encoder or the decoder according to the embodiments, any of the processes included in the method may be substituted or combined with a process presented anywhere in the description of aspects of the present disclosure or with any corresponding or equivalent process.

(7) One or more processes included in methods implemented by the encoder or the decoder according to the embodiments may be combined with a process presented anywhere in the description of aspects of the present disclosure.

Note that the implementation of the processes and/or configurations presented in the description of aspects of the present disclosure is not limited to the encoder or the decoder in the above examples. For example, the processes and/or configurations may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder]

First, the encoder according to Embodiment 1 will be described. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each of pictures included in an input moving picture (video) into blocks, and outputs each block to subtractor 104. For example, splitter 102 first splits a picture into blocks of a fixed size (for example, 128×128). The fixed size block is also referred to as a coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in various processing examples, there is no need to differentiate between CU, PU, and TU; all or some of the blocks in a picture may be processed in units of a CU, a PU, or a TU.

Figure 2:
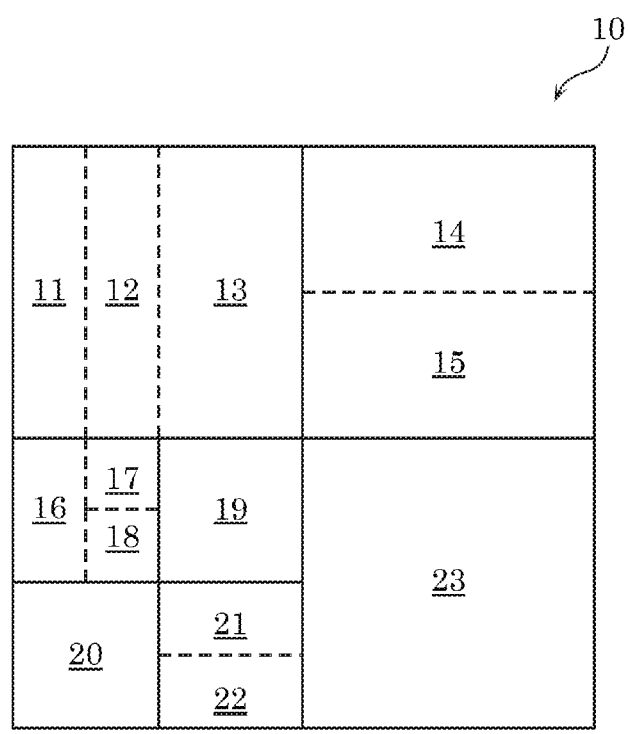
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting. Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) in units of a block input from splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal which has been input into encoder 100 and represents an image of each picture included in a video (for example, a luma signal and two chroma signals). Hereinafter, a signal representing an image is also referred to as a sample.

[Transformer]

Transformer 106 transforms prediction errors in spatial domain into transform coefficients in frequency domain, and outputs the transform coefficients to quantizer 108. More specifically, transformer 106 applies, for example, a predefined discrete cosine transform (DCT) or discrete sine transform (DST) to prediction errors in spatial domain.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is normally signaled at the CU level. Note that the signaling of such information need not be performed at the CU level, and may be performed at another level (for example, at the sequence level, picture level, slice level, tile level, or CTU level).

In addition, transformer 106 may apply a secondary transform to the transform coefficients (transform result). Such a secondary transform is also referred to as adaptive secondary transform (AST) or non-separable secondary transform (NSST). For example, transformer 106 applies a secondary transform in units of a sub-block (for example, each 4×4 sub-block) included in a transform coefficient block corresponding to an intra prediction error. Information indicating whether to apply NSST and information related to the transform matrix used in NSST are normally signaled at the CU level. Note that the signaling of such information need not be performed at the CU level, and may be performed at another level (for example, at the sequence level, picture level, slice level, tile level, or CTU level).

Transformer 106 may employ a separable transform and a non-separable transform. A separable transform is a method in which a transform is performed a plurality of times by separately performing a transform for each direction according to the number of dimensions of inputs. A non-separable transform is a method of performing a collective transform in which two or more dimensions in multidimensional inputs are collectively regarded as a single dimension.

In one example of a non-separable transform, when the input is a 4×4 block, the 4×4 block is regarded as a single array including 16 elements, and the transform applies a 16×16 transform matrix to the array.

In another example of a non-separable transform, a 4×4 input block is regarded as a single array including 16 elements, and then a transform (hypercube givens transform) in which givens revolution is performed on the array a plurality of times may be performed.

[Quantizer]

Quantizer 108 quantizes the transform coefficients output from transformer 106. More specifically, quantizer 108 scans, in a determined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112. The determined scanning order may be predetermined.

A determined scanning order is an order for quantizing/inverse quantizing transform coefficients. For example, a determined scanning order may be defined as ascending order of frequency (from low to high frequency) or descending order of frequency (from high to low frequency).

A quantization parameter (QP) is a parameter defining a quantization step size (quantization width). For example, when the value of the quantization parameter increases, the quantization step size also increases. In other words, if the value of the quantization parameter increases, the quantization error increases.

[Entropy Encoder]

Entropy encoder 110 generates an encoded signal (encoded bitstream) based on quantized coefficients which have been input from quantizer 108. More specifically, entropy encoder 110, for example, binarizes quantized coefficients, arithmetically encodes the binary signal, and outputs a compressed bit stream or sequences.

[Inverse Quantizer]

Inverse quantizer 112 inverse quantizes quantized coefficients which have been input from quantizer 108. More specifically, inverse quantizer 112 inverse quantizes, in a determined scanning order, quantized coefficients of the current block. Inverse quantizer 112 then outputs the inverse quantized transform coefficients of the current block to inverse transformer 114. The determined scanning order may be predetermined.

[Inverse Transformer]

Inverse transformer 114 restores prediction errors by inverse transforming transform coefficients which have been input from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors which have been input from inverse transformer 114 and prediction samples which have been input from prediction controller 128. Adder 116 then outputs the reconstructed block to block memory 118 and loop filter 120. A reconstructed block is also referred to as a local decoded block.

[Block Memory]

Block memory 118 is, for example, storage for storing blocks in a picture to be encoded (hereinafter referred to as a current picture) which is referred to in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In an ALF, a least square error filter for removing compression artifacts is applied. For example, one filter from among a plurality of filters is selected based on the direction and activity of local gradients and is applied for each of 2×2 sub-blocks in the current block.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
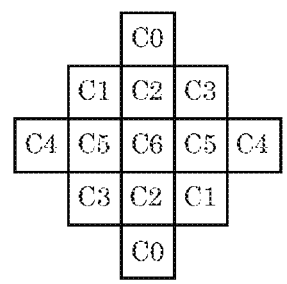
FIG. 4A illustrates one example of a filter shape used in an adaptive loop filter (ALF).
Figure 4B:
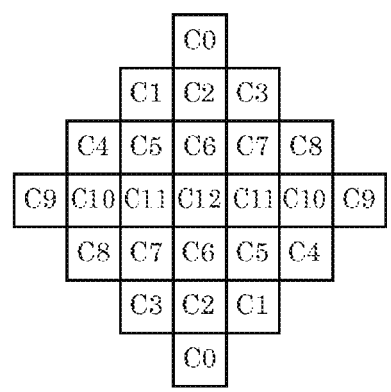
FIG. 4B illustrates another example of a filter shape used in an ALF.
Figure 4C:
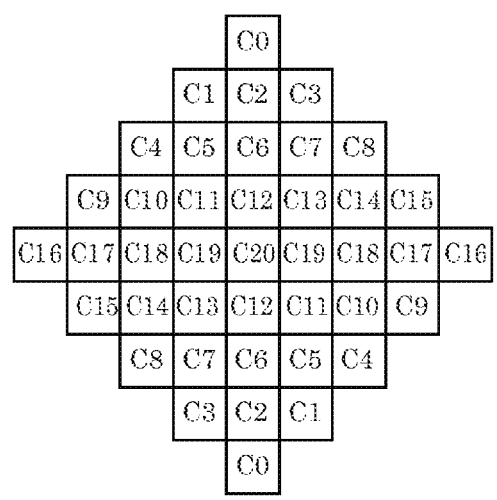
FIG. 4C illustrates another example of a filter shape used in an ALF.

The filter shape to be used in an ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is normally signaled at the picture level. Note that the signaling of such information indicating the filter shape does not necessarily need to be performed at the picture level, and may be performed at another level (for example, at the sequence level, slice level, tile level, CTU level, or CU level).

The enabling or disabling of ALF is determined, for example, at the picture level or CU level. For example, the decision of whether to apply the ALF to luma may be made at the CU level, and the decision of whether to apply the ALF to chroma may be made at the picture level. Information indicating whether the ALF is enabled or disabled is normally signaled at the picture level or CU level. Note that the signaling of information indicating whether the ALF is enabled or disabled does not necessarily need to be performed at the picture level or CU level, and may be performed at another level (for example, at the sequence level, slice level, tile level, or CTU level).

The coefficient set for the plurality of selectable filters (for example, 15 or 25 filters) is normally signaled at the picture level. Note that the signaling of the coefficients set does not necessarily need to be performed at the picture level, and may be performed at another level (for example, at the sequence level, slice level, tile level, CTU level, CU level, or sub-block level).

[Frame Memory]

Frame memory 122 is, for example, storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by performing intra prediction (also referred to as intra frame prediction) of the current block by referring to a block or blocks in the current picture stored in block memory 118. More specifically, intra predictor 124 generates an intra prediction signal by performing intra prediction by referring to samples (for example, luma and/or chroma values) of a block or blocks neighboring the current block, and then outputs the intra prediction signal to prediction controller 128.

For example, intra predictor 124 performs intra prediction by using one mode from among a plurality of intra prediction modes which have been defined. The intra prediction modes include one or more non-directional prediction modes and a plurality of directional prediction modes. The defined modes may be predetermined.

The one or more non-directional prediction modes include, for example, the planar prediction mode and DC prediction mode defined in the H.265/high-efficiency video coding (HEVC) standard (see NPL 1).

Figure 5A:
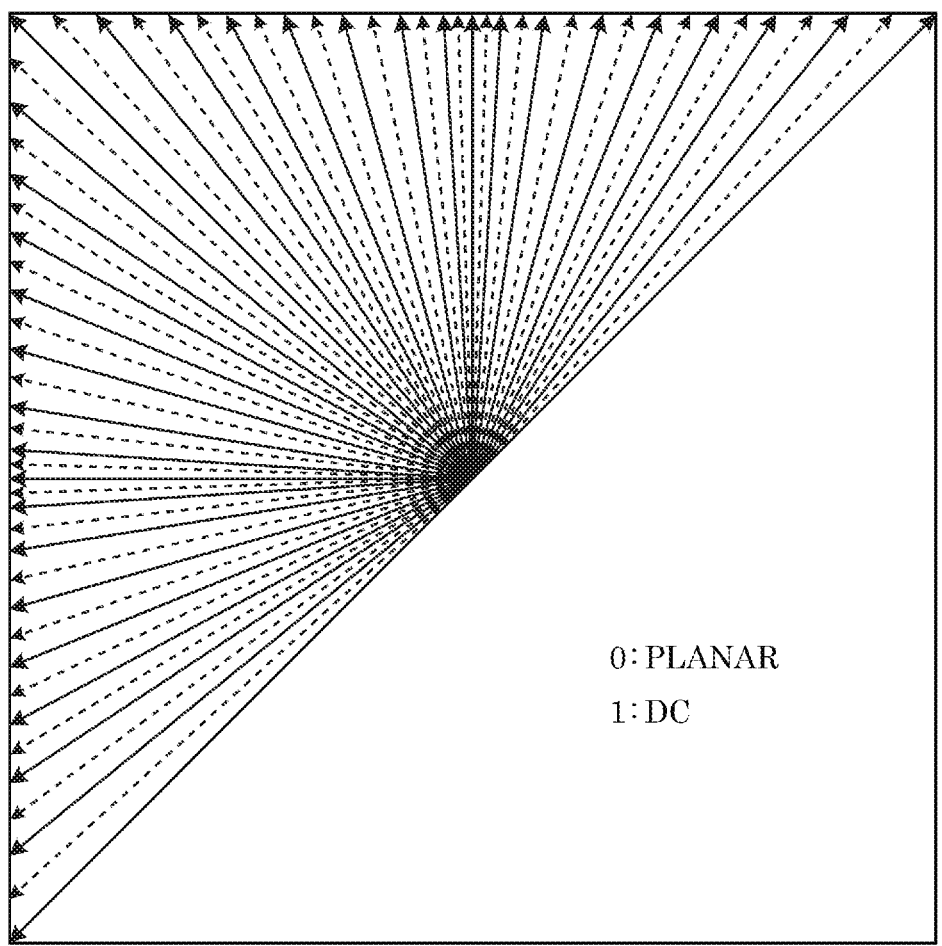
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

In various processing examples, a luma block may be referred to in intra prediction of a chroma block. In other words, a chroma component of the current block may be predicted based on a luma component of the current block. Such intra prediction is also referred to as cross-component linear model (CCLM) prediction. The intra prediction mode for a chroma block in which such a luma block is referred to (also referred to as, for example, a CCLM mode) may be added as one of the intra prediction modes for chroma blocks.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is normally signaled at the CU level. Note that the signaling of this information does not necessarily need to be performed at the CU level, and may be performed at another level (for example, on the sequence level, picture level, slice level, tile level, or CTU level).

[Inter Predictor]

Inter predictor 126 generates a prediction signal (inter prediction signal) by performing inter prediction (also referred to as inter frame prediction) of the current block by referring to a block or blocks in a reference picture, which is different from the current picture and is stored in frame memory 122. Inter prediction is performed in units of a current block or a current sub-block (for example, per 4×4 block) in the current block. For example, inter predictor 126 performs motion estimation in a reference picture for the current block or the current sub-block, and find out a reference block or a sub-block which best matches the current block or the current sub-block. Inter predictor 126 then obtains motion information (for example, a motion vector) which compensates a motion or a change from the reference block or the sub-block to the current block or the current sub-block. Inter predictor 126 generates an inter prediction signal of the current block or the current sub-block by performing motion compensation (or motion prediction) based on the motion information. Inter predictor 126 then outputs the generated inter prediction signal to prediction controller 128.

The motion information used in motion compensation may be signaled as inter prediction signals in various forms. For example, a motion vector may be signaled. As another example, the difference between a motion vector and a motion vector predictor may be signaled.

Note that the inter prediction signal may be generated using motion information of a neighboring block in addition to motion information of the current block obtained from motion estimation. More specifically, the inter prediction signal may be generated in units of a sub-block in the current block by calculating a weighted sum of a prediction signal, based on motion information obtained from motion estimation (in the reference picture), and a prediction signal based on motion information of a neighboring block (in the current picture). Such inter prediction (motion compensation) is also referred to as overlapped block motion compensation (OBMC).

In OBMC mode, information indicating sub-block size for OBMC (referred to as, for example, OBMC block size) may be signaled at the sequence level. Moreover, information indicating whether to apply the OBMC mode (referred to as, for example, an OBMC flag) may be signaled at the CU level. Note that the signaling of such information does not necessarily need to be performed at the sequence level and CU level, and may be performed at another level (for example, at the picture level, slice level, tile level, CTU level, or sub-block level).

Figure 5B:
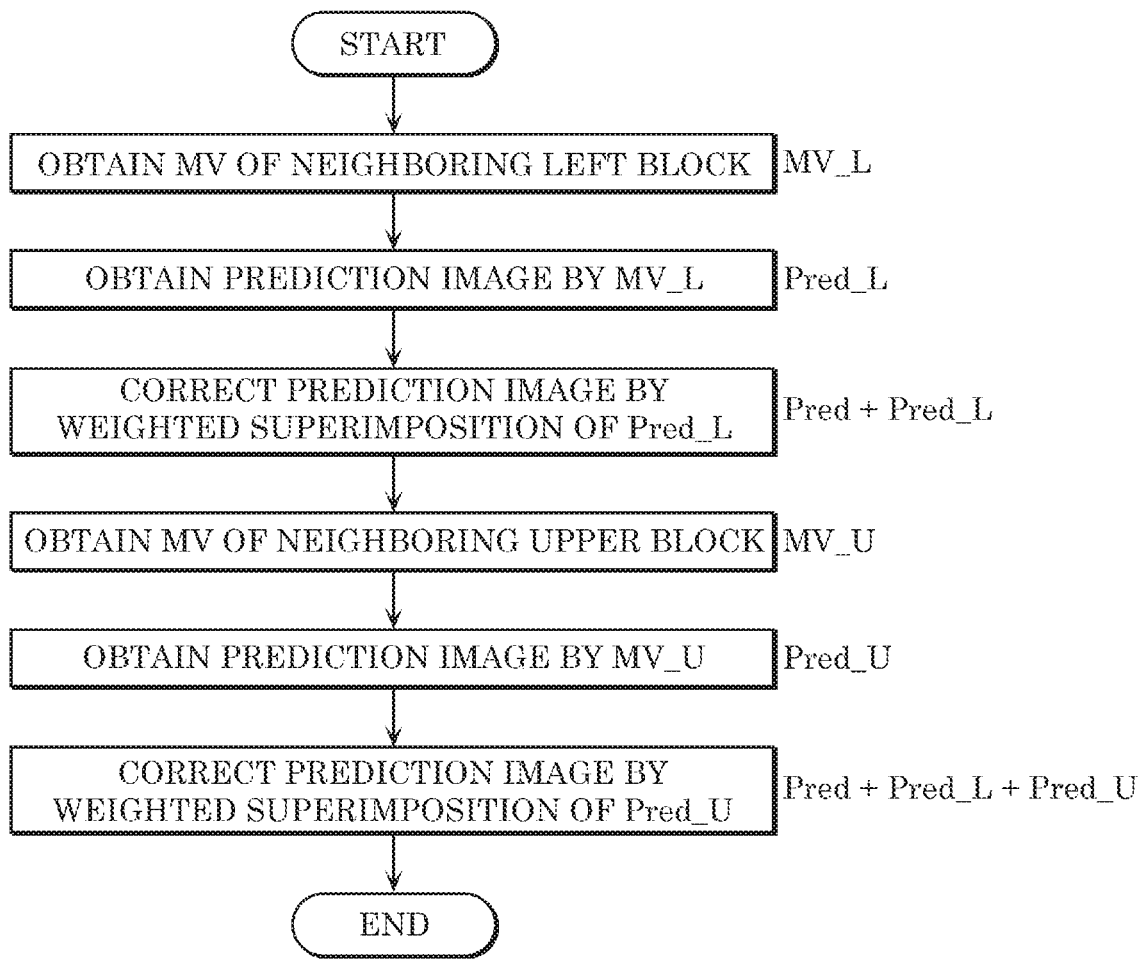
FIG. 5B is a flow chart illustrating one example of a prediction image correction process performed by an overlapped block motion compensation (OBMC) process.
Figure 5C:
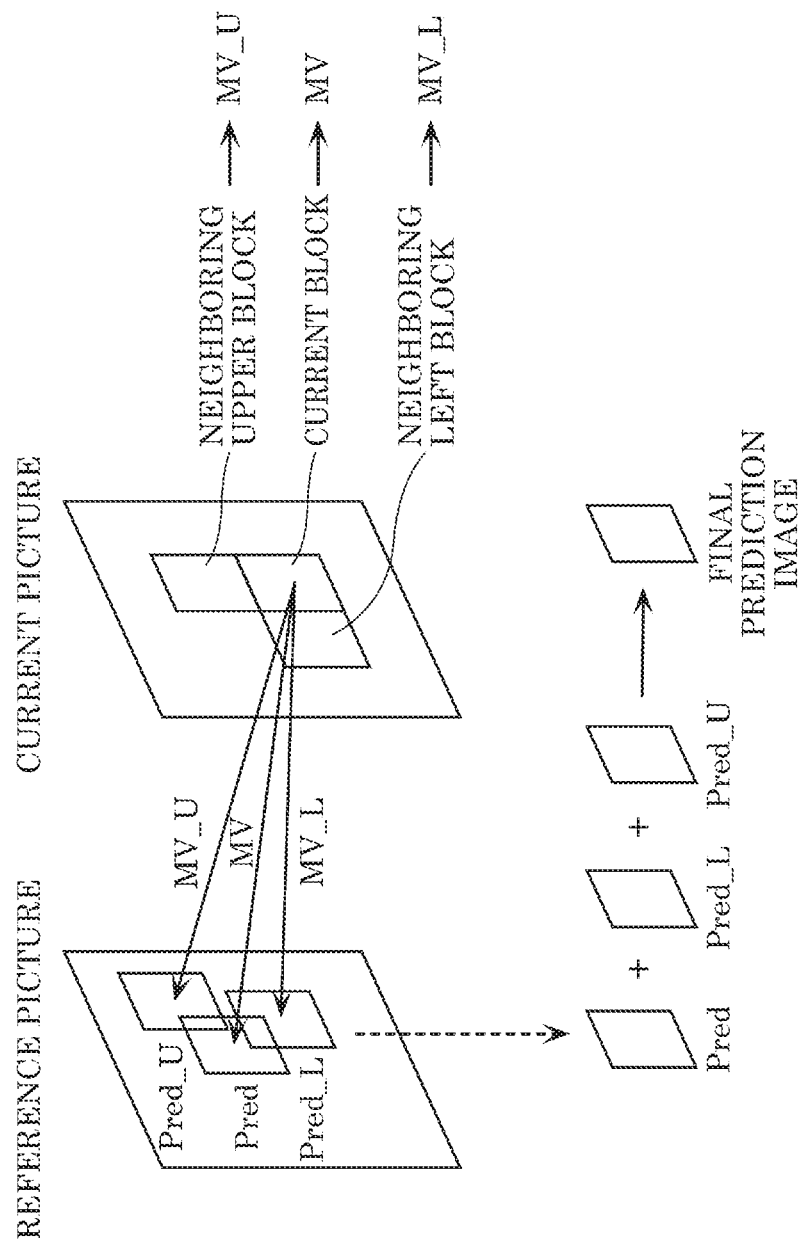
FIG. 5C is a conceptual diagram for illustrating one example of a prediction image correction process performed by an OBMC process.

Examples of the OBMC mode will be described in further detail. FIG. 5B is a flowchart and FIG. 5C is a conceptual diagram for illustrating an outline of a prediction image correction process performed by an OBMC process.

First, a prediction image (Pred) is obtained through normal motion compensation using a motion vector (MV) assigned to the current block.

Next, a prediction image (Pred_L) is obtained by applying a motion vector (MV_L) which has already been derived for the encoded block neighboring to the left of the current block to the current block (re-using the motion vector for the current block). The motion vector (MV_L) is indicated by an arrow "MV_L" indicating a reference picture from a current block. A first correction of a prediction image is performed by overlapping two prediction images Pred and Pred_L. This provides an effect of blending the boundary between neighboring blocks.

Similarly, a prediction image (Pred_U) is obtained by applying a motion vector (MV_U) which has been already derived for the encoded block neighboring above the current block to the current block (re-using the motion vector for the current block). The motion vector (MV_U) is indicated by an arrow "MV_U" indicating a reference picture from a current block. A second correction of a prediction image is performed by overlapping the prediction image Pred_U to the prediction images (for example, Pred and Pred_L) on which the first correction has been performed. This provides an effect of blending the boundary between neighboring blocks. The prediction image obtained by the second correction is the one in which the boundary between the neighboring blocks has been blended (smoothed), and thus is the final prediction image of the current block.

Although the above example is a two-path correction method using left and upper neighboring blocks, the correction method may be three- or more-path correction method also using the right neighboring block and/or the lower neighboring block.

Note that the region in which such overlapping is performed may be only part of a region near a block boundary instead of the pixel region of the entire block.

It is to be noted that the prediction image correction process according to OBMC for obtaining one prediction image Pred from one reference picture by overlapping additional prediction image Pred_L and Pred_U have been described above. However, when a prediction image is corrected based on a plurality of reference pictures, a similar process may be applied to each of the plurality of reference pictures. In such a case, after corrected prediction images are obtained from the respective reference pictures by performing OBMC image correction based on the plurality of reference pictures, the obtained corrected prediction images are further overlapped to obtain the final prediction image.

Note that, in OBMC, the unit of a current block may be the unit of a prediction block or the unit of a sub-block obtained by further splitting the prediction block.

One example of a method for determining whether to apply an OBMC process is a method for using an obmc_flag, which is a signal indicating whether to apply an OBMC process. As one specific example, an encoder determines whether the current block belongs to a region having complicated motion. The encoder sets the obmc_flag to a value of "1" when the block belongs to a region having complicated motion and applies an OBMC process when encoding, and sets the obmc_flag to a value of "0" when the block does not belong to a region having complication motion and encodes without applying an OBMC process. The decoder switches between application and non-application of an OBMC process by decoding the obmc_flag written in the stream (for example, a compressed sequence) and performing the decoding by switching between the application and non-application of the OBMC process in accordance with the flag value.

Motion information may be derived on the decoder side without being signaled from the encoder side. For example, a merge mode defined in the H.265/HEVC standard may be used. In addition, for example, motion information may be derived by performing motion estimation at the decoder side. In this case, at the decoder side, motion estimation is performed without using the pixel value in a current block.

Here, a mode for performing motion estimation at the decoder side is described. The mode for performing motion estimation at the decoder side may be referred to as a pattern matched motion vector derivation (PMMVD) mode, or a frame rate up-conversion (FRUC) mode.

Figure 5D:
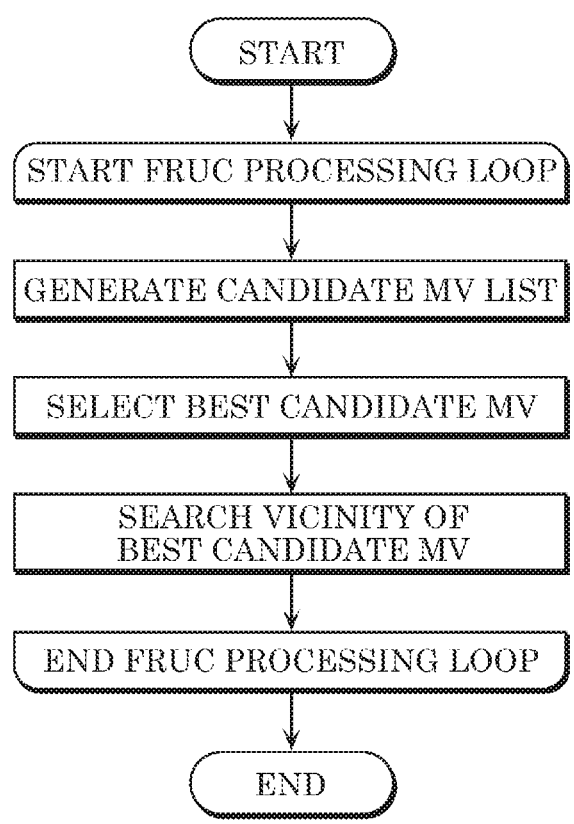
FIG. 5D is a flow chart illustrating one example of a frame rate up conversion (FRUC) process.

One example of a FRUC process is illustrated in FIG. 5D. First, a list of a plurality of candidates each having a motion vector (MV) predictor (that is, an MV candidate list that also may be used as a merge list) is generated by referring to a motion vector in an encoded block which spatially or temporally neighbor a current block. Next, a best MV candidate is selected from the plurality of MV candidates registered in the MV candidate list. For example, the evaluation values of the respective MV candidates included in the MV candidate list are calculated, and one MV candidate is selected based on the evaluation values.

Next, based on the selected motion vector candidates, a motion vector for the current block is derived. More specifically, for example, the selected motion vector candidate (best MV candidate) is derived directly as the motion vector for the current block. Alternatively, the motion vector for the current block may be derived using pattern matching in a surrounding region of a position in a reference picture where the position in the reference picture corresponds to the selected motion vector candidate. In other words, estimation using the pattern matching and the evaluation values may be performed in the surrounding region of the best MV candidate, and when there is an MV that yields a better evaluation value, the MV candidate may be updated to the MV that yields the better evaluation value, and the updated MV may be determined as the final MV for the current block. A configuration in which no such process for updating the best MV candidate to the MV having a better evaluation values is performed is also possible.

The same processes may be performed in cases in which the process is performed in units of a sub-block.

Evaluation values may be calculated according to various kinds of methods. For example, a comparison is made between a reconstructed image in a region in a reference picture corresponding to a motion vector, and a reconstructed image in a determined region (the region may be, for example, a region in another reference picture or a region in a neighboring block of a current picture). The determined region may be predetermined.

The difference between the pixel values of the two reconstructed images may be used for an evaluation value of the motion vectors. Note that the evaluation value may be calculated using information other than the value of the difference.

Next, an example of pattern matching is described. First, one MV candidate included in an MV candidate list (for example, a merge list) is selected as a start point of estimation by the pattern matching. For example, as the pattern matching, either a first pattern matching or a second pattern matching may be used. The first pattern matching and the second pattern matching are also referred to as bilateral matching and template matching, respectively.

In the first pattern matching, pattern matching is performed between two blocks along a motion trajectory of a current block which are two blocks in two different reference pictures. Accordingly, in the first pattern matching, a region in another reference picture along the motion trajectory of the current block is used as a determined region for calculating the evaluation value of the above-described candidate. The determined region may be predetermined.

Figure 6:
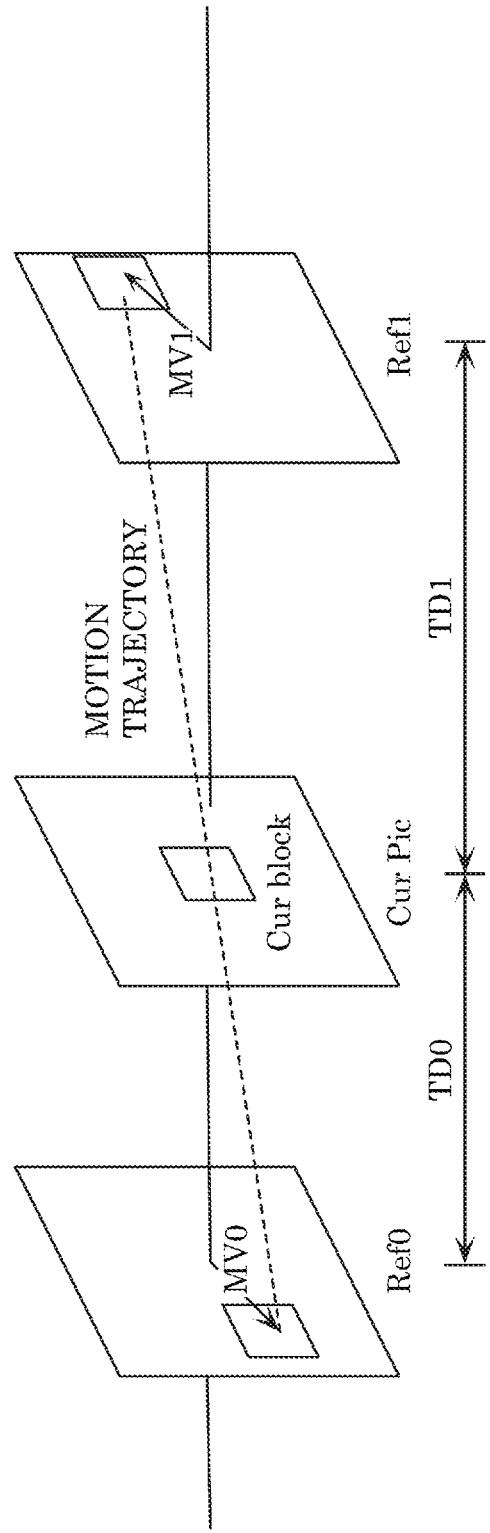
FIG. 6 is a conceptual diagram for illustrating one example of pattern matching (bilateral matching) between two blocks along a motion trajectory.

FIG. 6 is a conceptual diagram for illustrating one example of the first pattern matching (bilateral matching) between the two blocks in the two reference pictures along the motion trajectory. As illustrated in FIG. 6, in the first pattern matching, two motion vectors (MV0, MV1) are derived by estimating a pair which best matches among pairs in the two blocks in the two different reference pictures (Ref0, Ref1) which are the two blocks along the motion trajectory of the current block (Cur block). More specifically, a difference between the reconstructed image at a specified location in the first encoded reference picture (Ref0) specified by an MV candidate, and the reconstructed image at a specified location in the second encoded reference picture (Ref1) specified by a symmetrical MV obtained by scaling the MV candidate at a display time interval is derived for the current block, and an evaluation value is calculated using the value of the obtained difference. It is possible to select, as the final MV, the MV candidate which yields the best evaluation value among the plurality of MV candidates, and which is likely to produce good results.

In the assumption of a continuous motion trajectory, the motion vectors (MV0, MV1) specifying the two reference blocks are proportional to temporal distances (TD0, TD1) between the current picture (Cur Pic) and the two reference pictures (Ref0, Ref1). For example, when the current picture is temporally located between the two reference pictures and the temporal distances from the current picture to the two reference pictures are equal to each other, mirror-symmetrical bi-directional motion vectors are derived in the first pattern matching.

In the second pattern matching (template matching), pattern matching is performed between a block in a reference picture and a template in the current picture (the template is a block neighboring the current block in the current picture (the neighboring block is, for example, an upper and/or left neighboring block(s))). Accordingly, in the second pattern matching, the block neighboring the current block in the current picture is used as the determined region for calculating the evaluation value of the above-described candidate.

Figure 7:
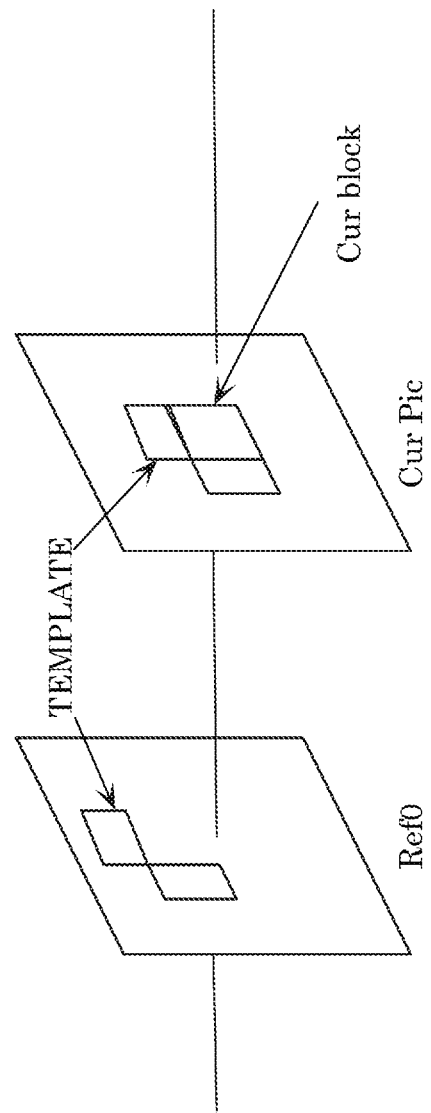
FIG. 7 is a conceptual diagram for illustrating one example of pattern matching (template matching) between a template in the current picture and a block in a reference picture.

FIG. 7 is a conceptual diagram for illustrating one example of pattern matching (template matching) between a template in a current picture and a block in a reference picture. As illustrated in FIG. 7, in the second pattern matching, the motion vector of the current block (Cur block) is derived by estimating, in the reference picture (Ref0), the block which best matches the block neighboring the current block in the current picture (Cur Pic). More specifically, it is possible that the difference between a reconstructed image in an encoded region which neighbors both left and above or either left or above and a reconstructed image which is in a corresponding region in the encoded reference picture (Ref0) and is specified by an MV candidate is derived, an evaluation value is calculated using the value of the obtained difference, and the MV candidate which yields the best evaluation value among a plurality of MV candidates is selected as the best MV candidate.

Such information indicating whether to apply the FRUC mode (referred to as, for example, a FRUC flag) may be signaled at the CU level. In addition, when the FRUC mode is applied (for example, when the FRUC flag is true), information indicating an applicable pattern matching method (either the first pattern matching or the second pattern matching) may be signaled at the CU level. Note that the signaling of such information does not necessarily need to be performed at the CU level, and may be performed at another level (for example, at the sequence level, picture level, slice level, tile level, CTU level, or sub-block level).

Next, a method for deriving a motion vector is derived. First, a mode for deriving a motion vector based on a model assuming uniform linear motion will be described. This mode is also referred to as a bi-directional optical flow (BIO) mode.

Figure 8:
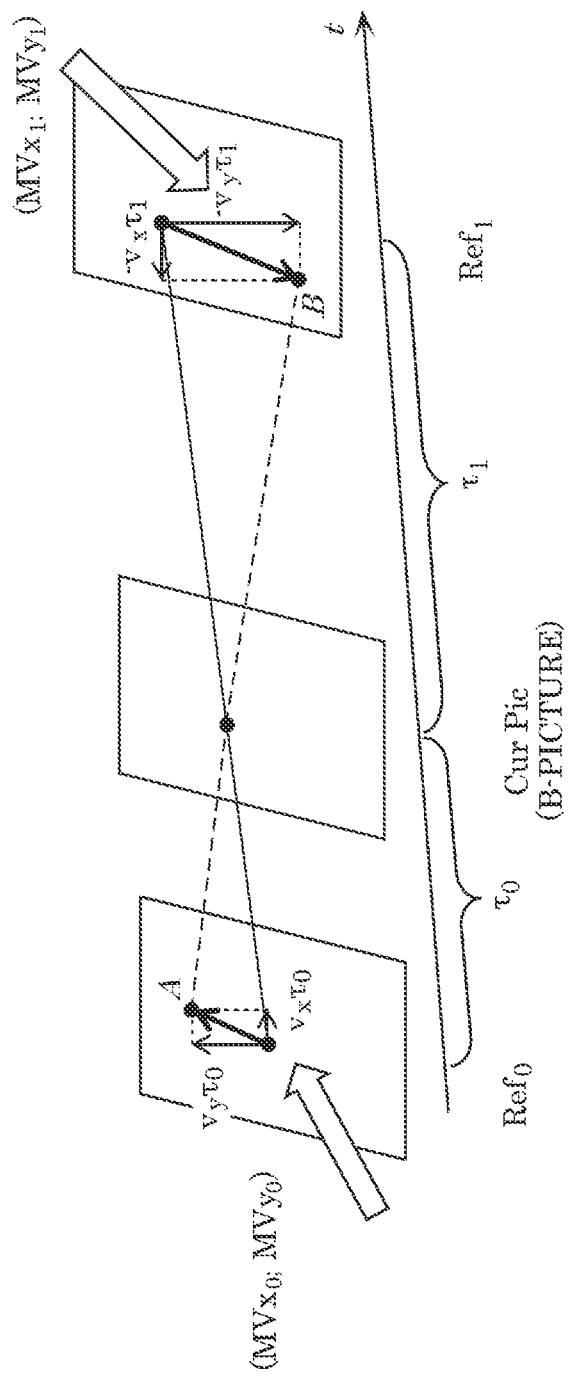
FIG. 8 is a conceptual diagram for illustrating a model assuming uniform linear motion.

FIG. 8 is a conceptual diagram for illustrating a model assuming uniform linear motion. In FIG. 8, $(v_x, v_y)$ indicates a velocity vector, and $\tau_0$ and $\tau_1$ indicate temporal distances between a current picture (Cur Pic) and two reference pictures ($Ref_0$, $Ref_1$). ($MVx_0$, $MVy_0$) indicate motion vectors corresponding to reference picture $Ref_0$, and ($MVx_1$, $MVy_1$) indicate motion vectors corresponding to reference picture $Ref_1$.

Here, under the assumption of uniform linear motion exhibited by velocity vector $(v_x, v_y)$, ($MVx_0$, $MVy_0$) and ($MVx_1$, $MVy_1$) are represented as $(v_x\tau_0, v_y\tau_0)$ and $(-v_x\tau_1, -v_y\tau_1)$, respectively, and the following optical flow equation may be employed.

MATH. 1

$$\partial I^{(k)}/\partial t + v_x \partial I^{(k)}/\partial x + v_y \partial I^{(k)}/\partial y = 0. \tag{1}$$

Here, $I^{(k)}$ indicates a motion-compensated luma value of reference picture k (k=0, 1). This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list may be corrected in units of a pixel, based on a combination of the optical flow equation and Hermite interpolation.

Note that a motion vector may be derived on the decoder side using a method other than deriving a motion vector based on a model assuming uniform linear motion. For example, a motion vector may be derived in units of a sub-block based on motion vectors of neighboring blocks.

Next, an affine mode for deriving a motion vector in units of a sub-block based on motion vectors of a plurality of neighboring blocks is described. This mode is also referred to as an affine motion compensation prediction mode.

Figure 9A:
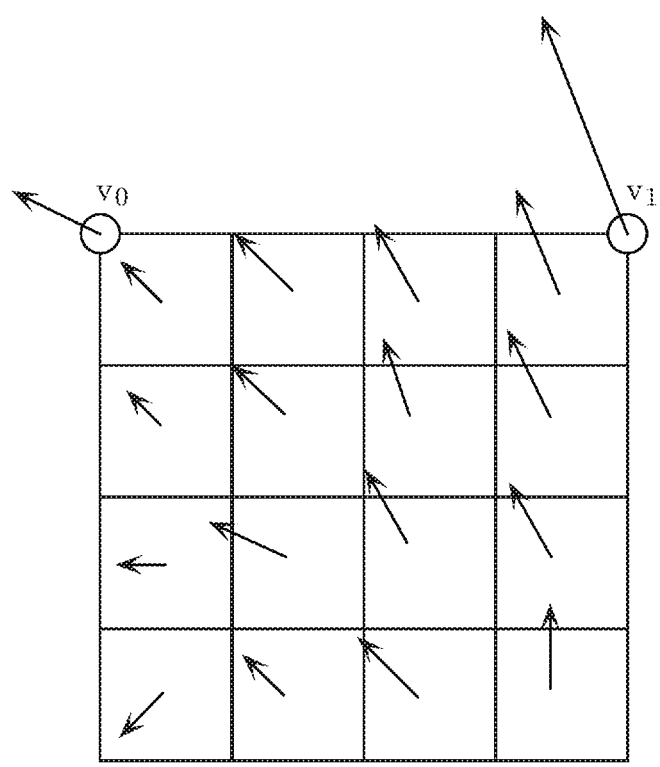
FIG. 9A is a conceptual diagram for illustrating one example of deriving a motion vector of each sub-block based on motion vectors of neighboring blocks.

FIG. 9A is a conceptual diagram for illustrating one example of deriving a motion vector of each sub-block, based on motion vectors of a plurality of neighboring blocks. In FIG. 9A, the current block includes sixteen 4×4 sub-blocks. Here, motion vector $v_0$ at an upper-left corner control point in the current block is derived based on motion vectors of neighboring sub-blocks, and likewise, motion vector $v_1$ at an upper-right corner control point in the current block is derived based on motion vectors of neighboring blocks. Two motion vectors $v_0$ and $v_1$ may be projected according to an expression (2) indicated below, and motion vectors ($v_x$, $v_y$) for the respective sub-blocks in the current block may be derived.

MATH. 2

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

Here, x and y indicate the horizontal position and the vertical position of the sub-block, respectively, and w indicates a determined weighted coefficient. The determined weighted coefficient may be predetermined.

An affine motion compensation prediction mode may include a number of modes of different methods of deriving the motion vectors of an upper-left and upper-right corner control points. Such information indicating the affine motion compensation prediction mode (for example, referred to as an affine flag) may be signaled at the CU level. Note that the signaling of information indicating the affine motion compensation prediction mode does not necessarily need to be performed at the CU level, and may be performed at another level (for example, at the sequence level, picture level, slice level, tile level, CTU level, or sub-block level).

[Prediction Controller]

Prediction controller 128 selects one of an intra prediction signal (a signal output from intra predictor 124) and an inter prediction signal (a signal output from inter predictor 126), and outputs the selected signal to subtractor 104 and adder 116 as a prediction signal.

Next, an example of deriving a motion vector in merge mode is provided. FIG. 9B is a conceptual diagram for illustrating one example of a motion vector derivation process of a current picture in merge mode.

First, an MV candidate list in which MV predictor candidates are registered is generated. Examples of MV predictor candidates include: spatially neighboring MV predictors which are MVs of a plurality of encoded blocks located spatially surrounding a current block; temporally neighboring MV predictors which are MVs of surrounding blocks on which the position of a current block in an encoded reference picture is projected; combined MV predictors which are MVs generated by combining the MV values of a spatially neighboring MV predictor and the MV of a temporally neighboring MV predictor; and a zero MV predictor which is an MV having a zero value.

Next, one MV predictor is selected from a plurality of MV predictors registered in an MV predictor list, and the selected MV predictor is determined as the MV of a current block.

Furthermore, the variable-length encoder describes and encodes, in a stream, a merge_idx which is a signal indicating which MV predictor has been selected.

Note that the MV predictors registered in the MV predictor list described in FIG. 9B are examples. The number of MV predictors registered in the MV predictor list may be different from the number of MV predictors in the diagram, and the MV predictor list may be configured in such a manner that some of the kinds of the MV predictors in the diagram may not be included, or that one or more MV predictors other than the kinds of MV predictors in the diagram are included.

A final MV may be determined by performing a decoder motion vector refinement (DMVR) process (to be described later) using the MV of the current block derived in merge mode.

The following describes an example of determining an MV using a DMVR process.

Figure 9C:
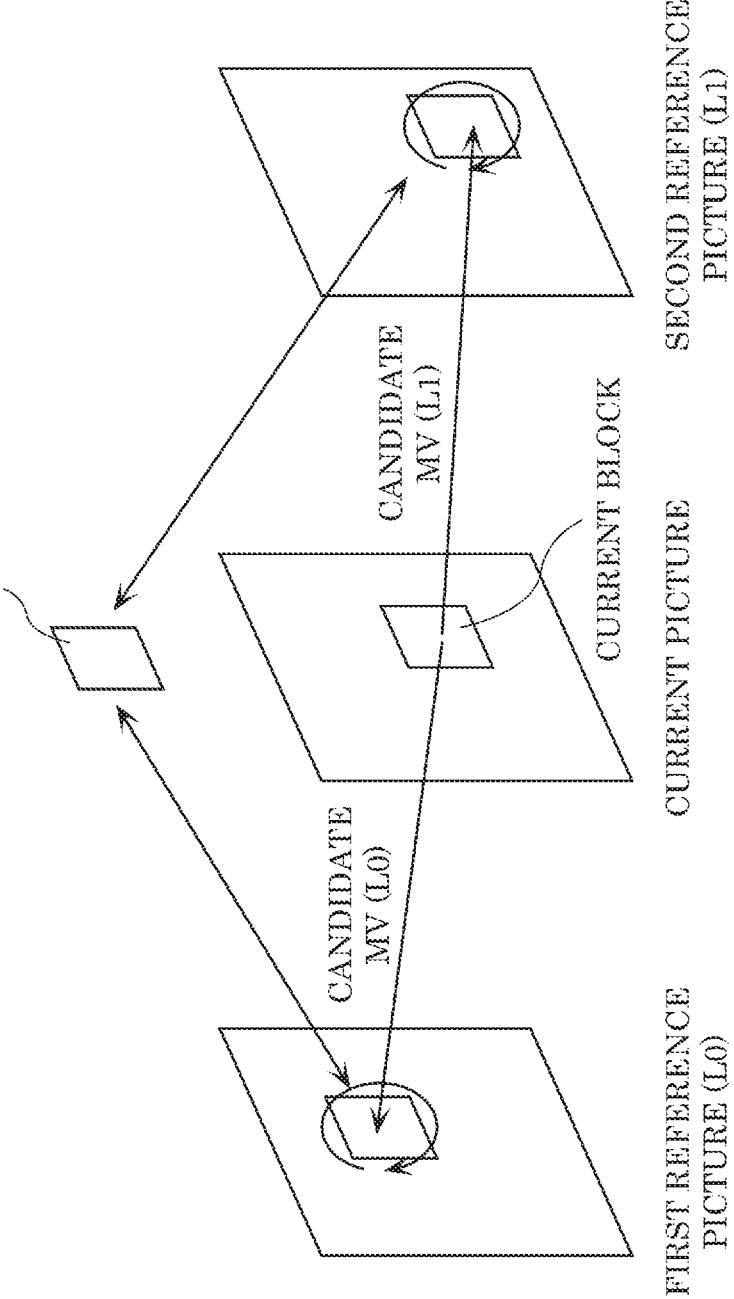
FIG. 9C is a conceptual diagram for illustrating one example of a decoder motion vector refinement (DMVR) process.

FIG. 9C is a conceptual diagram for illustrating one example of a DMVR process for determining an MV.

First, (for example, in merge mode), the best MVP which has been set to the current block is determined to be an MV candidate. A reference pixel is identified from a first reference picture (L0) which is an encoded picture in the L0 direction according to an MV candidate (L0). Likewise, a reference pixels is identified from a second reference picture (L1) which is an encoded picture in the L1 direction according to an MV candidate (L1). A template is generated by calculating an average of these reference pixels.

Next, using the template, each of the surrounding regions of MV candidates of the first reference picture (L0) and the second reference picture (L1) are estimated, and the MV which yields the smallest cost is determined to be the final MV. Note that the cost value may be calculated, for example, using a difference value between each of the pixel values in the template and a corresponding one of the pixel values in the estimation region, the values of MV candidates, etc.

Note that the processes, configurations, and operations described here typically are basically common between the encoder and a decoder to be described later.

Exactly the same example processes described here do not always need to be performed. Any process for enabling derivation of the final MV by estimation in surrounding regions of MV candidates may be used.

Next, an example of a mode in which a prediction image (prediction) is generated by using a local illumination compensation (LIC) process will be described.

Figure 9D:
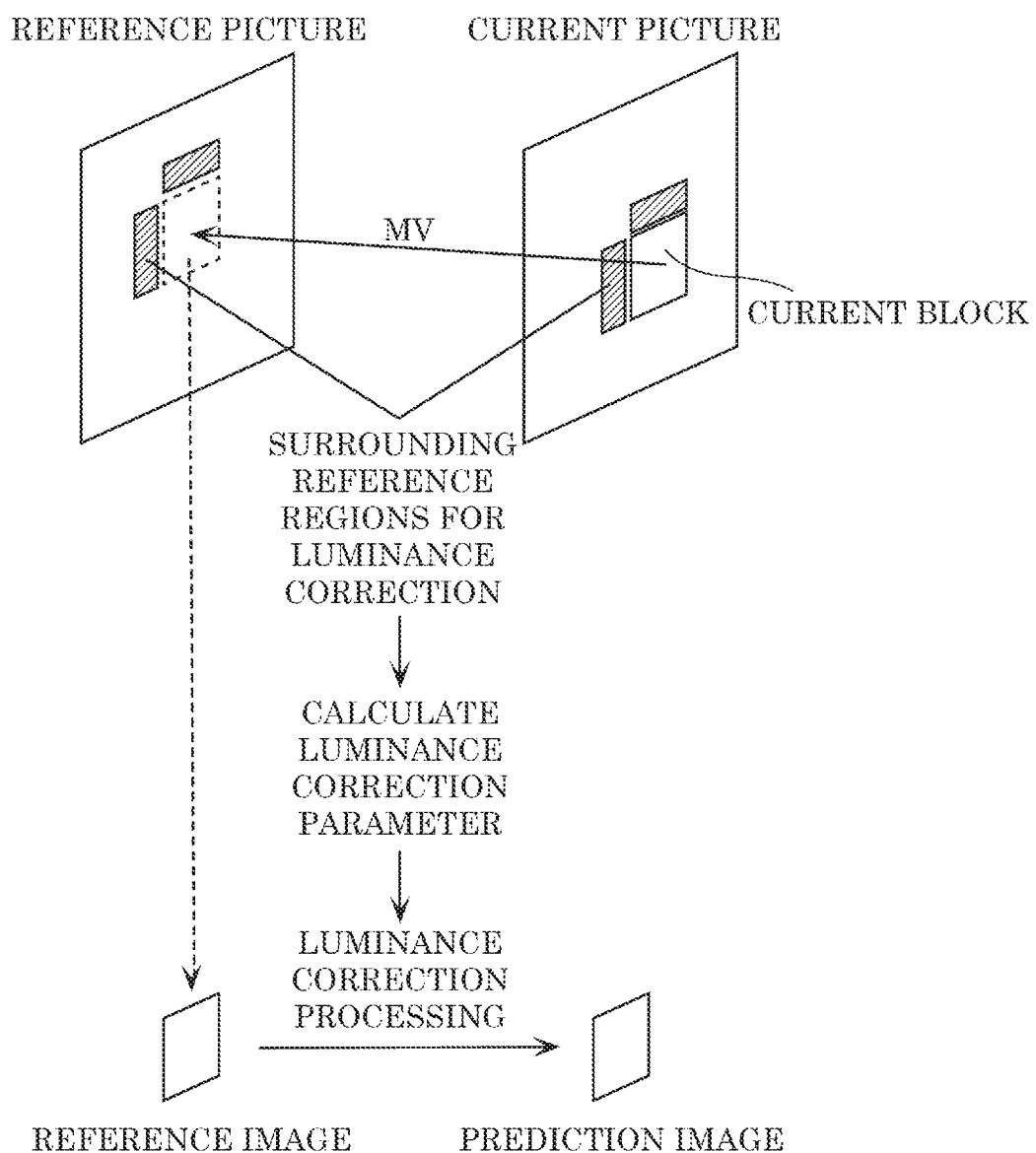
FIG. 9D is a conceptual diagram for illustrating one example of a prediction image generation method using a luminance correction process performed by a local illumination compensation (LIC) process.

FIG. 9D is a conceptual diagram for illustrating one example of a prediction image generation method using a luminance correction process performed by a LIC process.

First, an MV is derived from an encoded reference picture, and a reference image corresponding to the current block is obtained.

Next, information indicating how the luma value changed between the reference picture and the current picture is extracted for the current block. This extraction is performed based on the luma pixel values for the encoded left neighboring reference region (surrounding reference region) and the encoded upper neighboring reference region (surrounding reference region), and the luma pixel value at the corresponding position in the reference picture specified by the derived MV. A luminance correction parameter is calculated by using the information indicating how the luma value changed.

The prediction image for the current block is generated by performing a luminance correction process in which the luminance correction parameter is applied to the reference image in the reference picture specified by the MV.

Note that the shape of the surrounding reference region illustrated in FIG. 9D is just one example; the surrounding reference region may have a different shape.

Moreover, although the process in which a prediction image is generated from a single reference picture has been described here, cases in which a prediction image is generated from a plurality of reference pictures can be described in the same manner. The prediction image may be generated after performing a luminance correction process of the reference images obtained from the reference pictures in the same manner as described above.

One example of a method for determining whether to apply a LIC process is a method for using an lic_flag, which is a signal indicating whether to apply the LIC process. As one specific example, the encoder determines whether the current block belongs to a region having a luminance change. The encoder sets the lic_flag to a value of "1" when the block belongs to a region having a luminance change and applies a LIC process when encoding, and sets the lic_flag to a value of "0" when the block does not belong to a region having a luminance change and encodes the current block without applying a LIC process. The decoder may decode the lic_flag written in the stream and decode the current block by switching between application and non-application of a LLC process in accordance with the flag value.

One example of a different method of determining whether to apply a LIC process is a determining method in accordance with whether a LIC process was applied to a surrounding block. In one specific example, when the merge mode is used on the current block, whether a LIC process was applied in the encoding of the surrounding encoded block selected upon deriving the MV in the merge mode process is determined. According to the result, encoding is performed by switching between application and non-application of a LLC process. Note that, also in this example, the same processes are applied in processes at the decoder side.

[Decoder]

Figure 10:
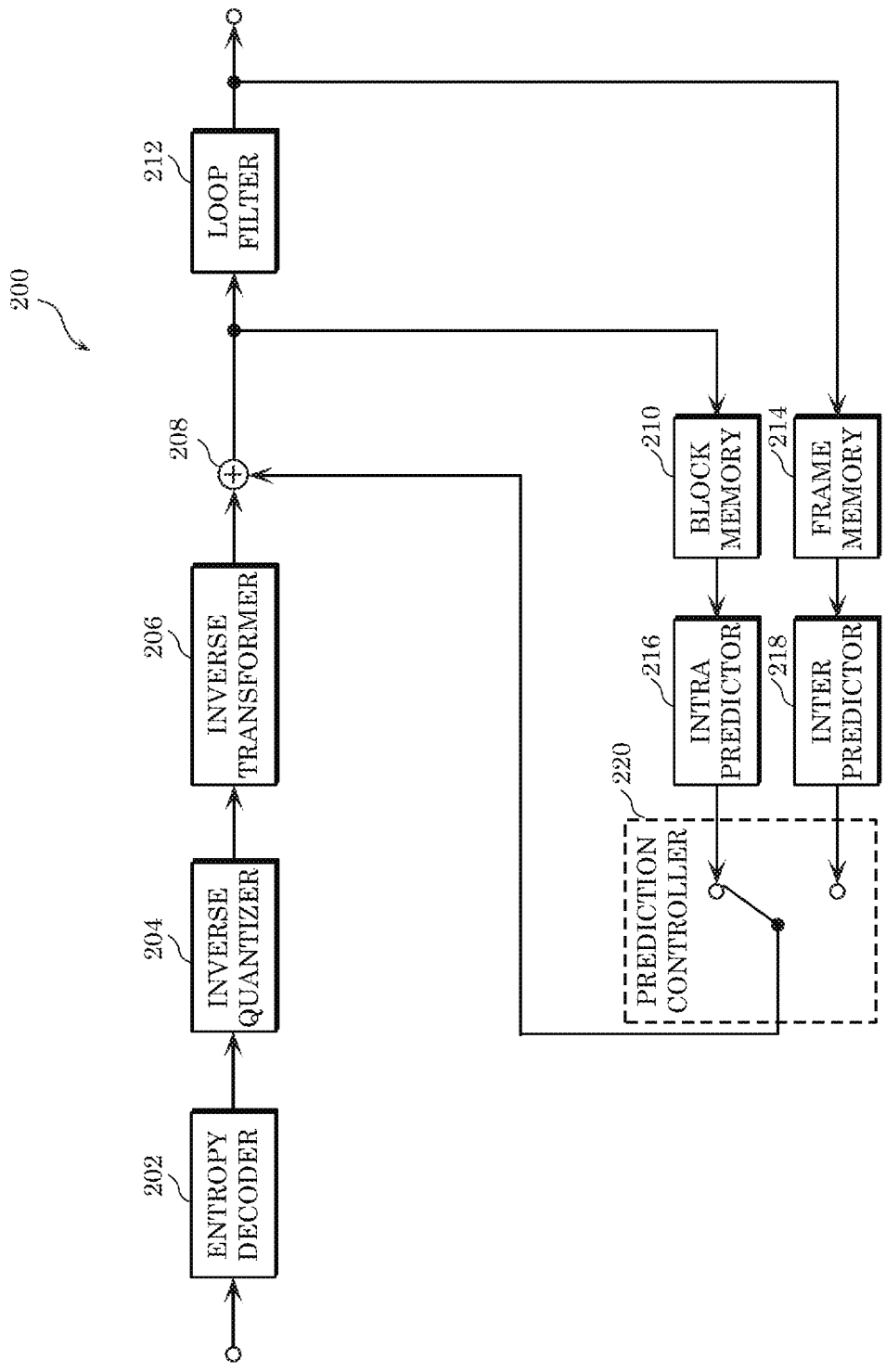
FIG. 10 is a block diagram illustrating a functional configuration of a decoder according to Embodiment 1.

Next, a decoder capable of decoding an encoded signal (encoded bitstream) output, for example, from encoder 100 described above will be described. FIG. 10 is a block diagram illustrating a functional configuration of decoder 200 according to Embodiment 1. Decoder 200 is a video decoder that decodes a video in units of a block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220

Decoder 200 is implemented as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be implemented as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block, based on quantization parameters corresponding to the quantized coefficients. Inverse quantizer 204 then outputs the inverse quantized transform coefficients of the current block to inverse transformer 206.

[Inverse Transformer]

Inverse transformer 206 restores prediction errors by inverse transforming transform coefficients which are inputs from inverse quantizer 204.

For example, when information parsed from an encoded bitstream indicates that EMT or AMT is to be applied (for example, when the AMT flag is true), inverse transformer 206 inverse transforms the transform coefficients of the current block based on information indicating the parsed transform type.

Moreover, for example, when information parsed from an encoded bitstream indicates that NSST is to be applied, inverse transformer 206 applies a secondary inverse transform to the transform coefficients.

[Adder]

Adder 208 reconstructs the current block by adding prediction errors which are inputs from inverse transformer 206 and prediction samples which are inputs from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) and to be referred to in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214, a display device, etc.

When information indicating enabling or disabling of an ALF parsed from an encoded bitstream indicates that an ALF is enabled, one filter from among a plurality of filters is selected based on direction and activity of local gradients, and the selected filter is applied to the reconstructed block.

[Frame Memory]

Frame memory 214 is, for example, storage for storing reference pictures for use in inter prediction, and is also referred to as a frame buffer. More specifically, frame memory 214 stores a reconstructed block filtered by loop filter 212.

[Intra Predictor]

Intra predictor 216 generates a prediction signal (intra prediction signal) by performing intra prediction by referring to a block or blocks in the current picture stored in block memory 210, based on the intra prediction mode parsed from the encoded bitstream. More specifically, intra predictor 216 generates an intra prediction signal by performing intra prediction by referring to samples (for example, luma and/or chroma values) of a block or blocks neighboring the current block, and then outputs the intra prediction signal to prediction controller 220.

Note that when an intra prediction mode in which a luma block is referred to in intra prediction of a chroma block is selected, intra predictor 216 may predict the chroma component of the current block based on the luma component of the current block.

Moreover, when information parsed from an encoded bitstream indicates that PDPC is to be applied, intra predictor 216 corrects intra-predicted pixel values based on horizontal/vertical reference pixel gradients.

[Inter Predictor]

Inter predictor 218 predicts the current block by referring to a reference picture stored in frame memory 214. Inter prediction is performed in units of a current block or a sub-block (for example, a 4×4 block) in the current block. For example, inter predictor 218 generates an inter prediction signal of the current block or the sub-block by performing motion compensation by using motion information (for example, a motion vector) parsed from an encoded bitstream (for example, a prediction parameter output from entropy decoder 202), and outputs the inter prediction signal to prediction controller 220.

Note that when the information parsed from the encoded bitstream indicates that the OBMC mode is to be applied, inter predictor 218 generates the inter prediction signal using motion information of a neighboring block in addition to motion information of the current block obtained from motion estimation.

Moreover, when the information parsed from the encoded bitstream indicates the FRUC mode is to be applied, inter predictor 218 derives motion information by performing motion estimation in accordance with the pattern matching method (bilateral matching or template matching) parsed from the encoded bitstream. Inter predictor 218 then performs motion compensation (prediction) using the derived motion information.

Moreover, when the BIO mode is to be applied, inter predictor 218 derives a motion vector based on a model assuming uniform linear motion. Moreover, when the information parsed from the encoded bitstream indicates that the affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208. As a whole, the configurations, functions, and processes of prediction controller 220, intra predictor 216, and inter predictor 218 at the decoder side may correspond to the configurations, functions, and processes of prediction controller 128, intra predictor 124, and inter predictor 126 at the encoder side. It is to be noted that all or part of the following constituent elements may be included in a predictor: intra predictor 216; inter predictor 218; and prediction controller 220.

Variation 1 of Embodiment 1

Next, Variation 1 of Embodiment 1 will be described. The present variation describes block splitting in detail. Note that the configuration of an encoder is the same as that illustrated in the above-described Embodiment 1. Accordingly, duplicate depiction and description are omitted.

[Process Performed by Splitter]

Figure 11:
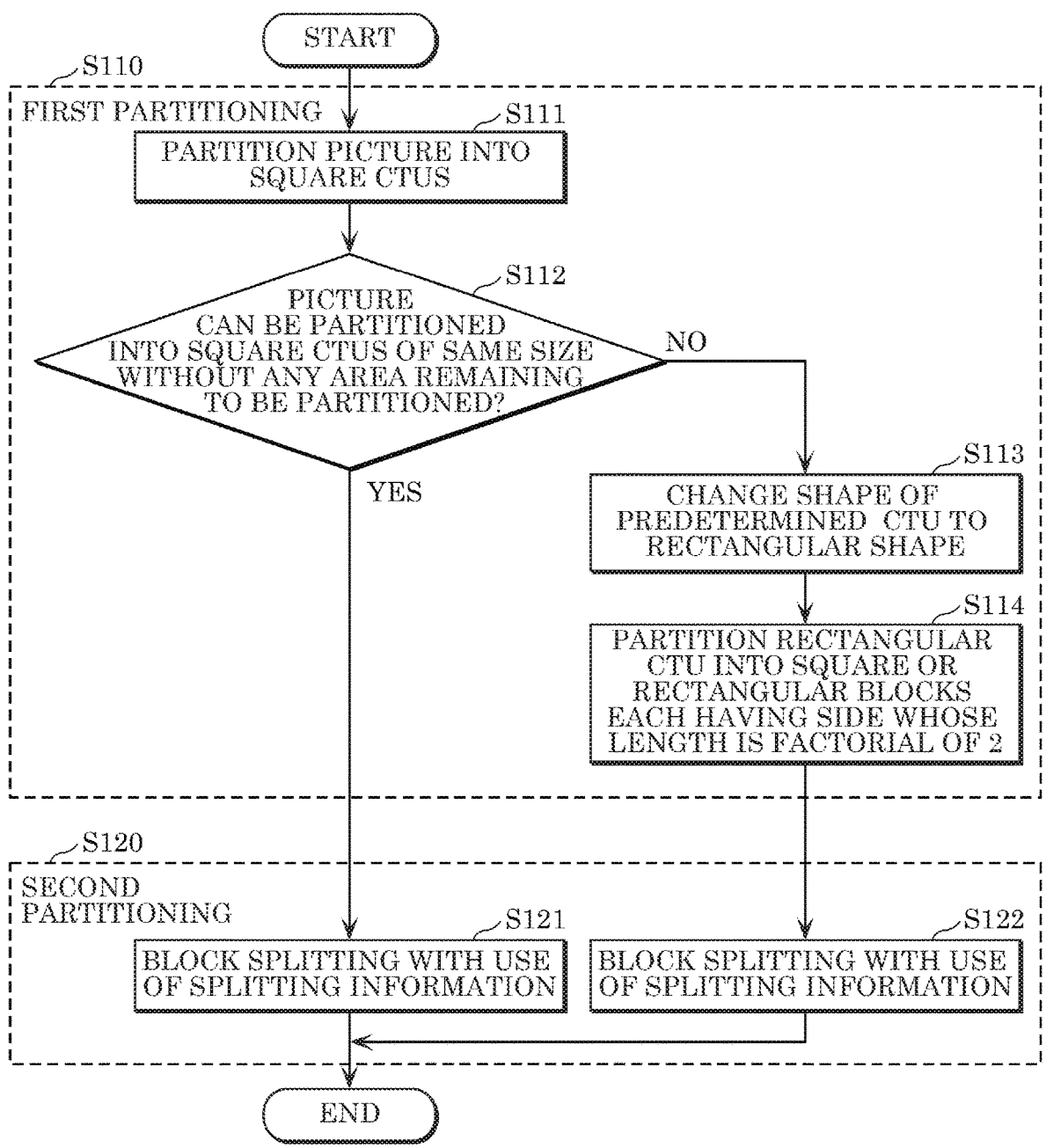
FIG. 11 is a flowchart illustrating an example of a process performed by a splitter according to Variation 1 of Embodiment 1.

A process performed by splitter 102 in encoder 100 according to the present variation will be described in detail with reference to FIG. 11. FIG. 11 is a flowchart illustrating an example of the process performed by splitter 102 according to Variation 1 of Embodiment 1.

First, splitter 102 performs a first partitioning on a picture (S110). The first partitioning means a block splitting process performed without the use of splitting information that is added into a bitstream. For example, in the first partitioning, a picture is divided using a square block having a fixed block size. The first partitioning may be, for example, a partitioning process performed by an encoder or a decoder in a fixed manner using a partitioning method predetermined for each sequence, slice, or tile.

Subsequently, splitter 102 performs a second partitioning on blocks obtained as a result of the first partitioning (S120). Information on the second partitioning is inputted to entropy encoder 110 and is added into a bitstream. Note that the information on the second partitioning does not always need to be entropy encoded. For example, when the information on the second partitioning is flag information, the information may be directly included in a bitstream.

The second partitioning means a block splitting process performed with the use of splitting information that is added into a bitstream. For example, in the second partitioning, a block is recursively split. For example, a quadtree splitting, a ternary tree splitting, a binary tree splitting, or any combination thereof may be used to perform the second partitioning.

The information on the second partitioning is information used by a decoder to reproduce the second partitioning, which has been performed by an encoder. This enables the decoder to reconstruct a picture from a plurality of encoded blocks. The information on the second partitioning is, for example, information indicating how a CTU was recursively split, and may include information indicating a partitioning method. The information indicating a partitioning method may be, for example, information indicating whether to split a block or information indicating whether to split a block into four, three, or two sub-blocks. The information on the second partitioning may include information indicating a split direction. The information indicating a split direction may be, for example, information indicating whether to split a block in a vertical or horizontal direction. The information indicating a partitioning method and the information indicating a split direction may be indicated by the same flag.

In the first partitioning, splitter 102 first divides a picture using a square block having a fixed block size (S111). The square block having a fixed block size is also referred to as a square coding tree unit (CTU).

In some cases, a picture can be partitioned into square CTUs of the same size without any area remaining to be partitioned, while such is not the case in other cases, depending on the size of a picture. Namely, there are two cases: the case where a whole picture can be partitioned into the same-size CTUs only; and the case otherwise in which an area remains to be partitioned after a picture is partitioned into the same-size CTUs.

In the present variation, when the picture can be partitioned into square CTUs of the same size without any area remaining to be partitioned (YES at S112), splitter 102 does not perform block splitting any further in the first partitioning and performs the second partitioning. In other words, when the picture is partitioned into a plurality of blocks including only square CTUs each having a fixed block size in the first partitioning, splitter 102 ends the first partitioning and performs, on the plurality of blocks including only square CTUs, the second partitioning which uses splitting information.

On the other hand, when the picture cannot be partitioned into square CTUs of the same size without any area remaining to be partitioned (NO at S112), splitter 102 further partitions the remaining area in the picture into rectangular blocks (S113). Each of the rectangular blocks generated in the remaining area is referred to as a rectangular CTU. In other words, splitter 102 partitions the picture into square CTUs and rectangular CTUs. In other words, splitter 102 changes the shape of a CTU to a rectangular shape in the remaining area.

Note that "rectangular" here means being a quadrilateral with four angles of equal degrees, but excluding a square. In other words, "rectangular" means non-square and having two pairs of sides facing each other, with the length of the sides of one pair differing from that of the sides of the other pair.

Subsequently, splitter 102 further partitions each of the rectangular CTUs without using splitting information (S114). In other words, splitter 102 further partitions each of the rectangular CTUs in the first partitioning. Specifically, splitter 102 partitions each rectangular CTU into square blocks and/or rectangular blocks, each block having a side whose length is an integer power of 2. After that, splitter 102 ends the first partitioning and performs the second partitioning which uses splitting information (S122). In other words, splitter 102 performs the second partitioning on the square CTUs and on the square blocks and/or rectangular blocks in the rectangular CTUs.

Example 1 of First Partitioning

Figure 12:
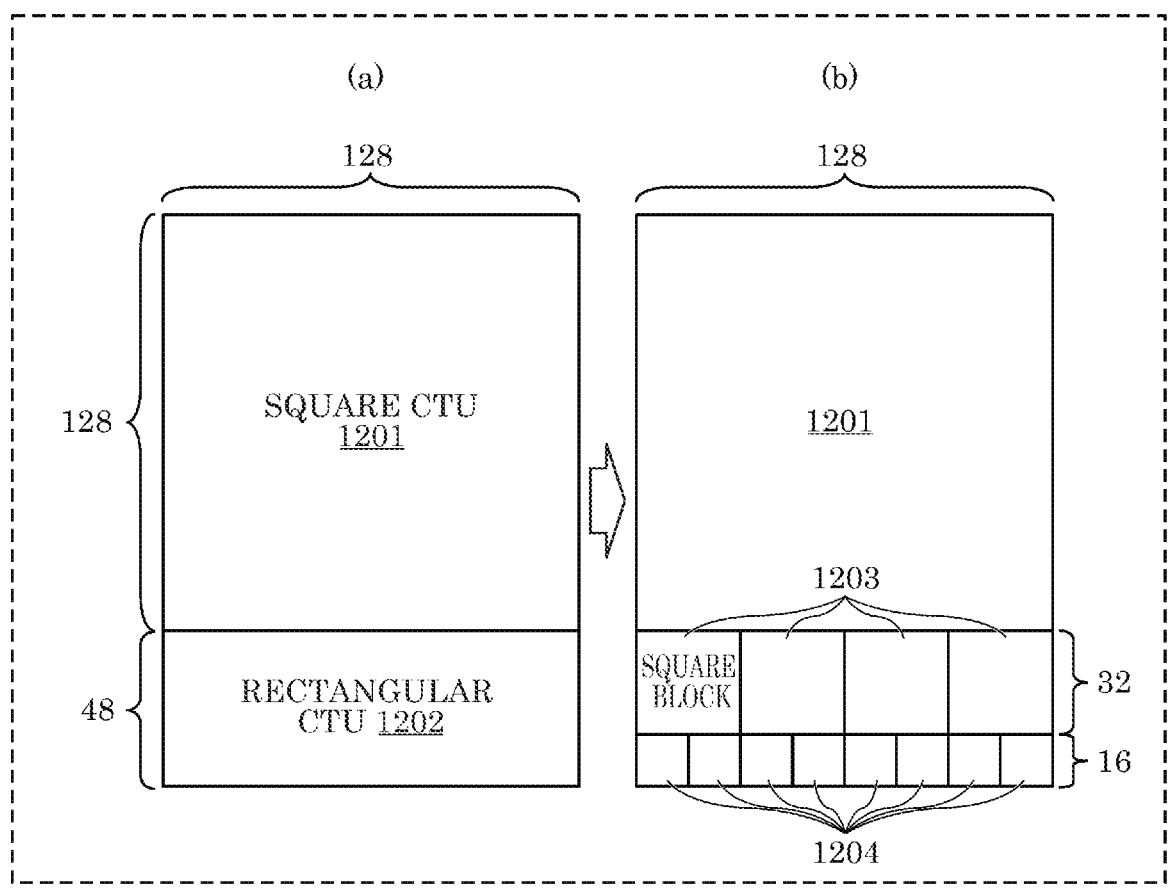
FIG. 12 illustrates one example of a first partitioning according to Variation 1 of Embodiment 1.

Example 1 of the first partitioning will be described herein with reference to FIG. 12. FIG. 12 illustrates an example of the first partitioning according to Variation 1 of Embodiment 1. In the present example, a rectangular CTU that is in contact with the edge of a picture is partitioned into a plurality of square blocks in the first partitioning.

In FIG. 12, a picture size is 160×128 pixels, and a square CTU has a fixed block size of 128×128 pixels.

In this case, when a picture is divided using square CTU 1201 having the size of 128×128 pixels, rectangular CTU 1202 having the size of 48×128 pixels is generated at the lower edge of the picture, as illustrated in (a) in FIG. 12.

Rectangular CTU 1202 thus generated is partitioned into square blocks each having a side whose length is the integer power of 2, as illustrated in (b) in FIG. 12. Here, it is desirable to partition an area closer to the lower edge of the picture into smaller-sized blocks.

Since the shorter side of rectangular CTU 1202 is 48 pixels (=32 (the fifth power of 2)+16 (the fourth power of 2), rectangular CTU 1202 is partitioned into four square blocks 1203 sized 32×32 pixels and eight square blocks 1204 sized 16×16 pixels.

Example 2 of First Partitioning

Figure 13:
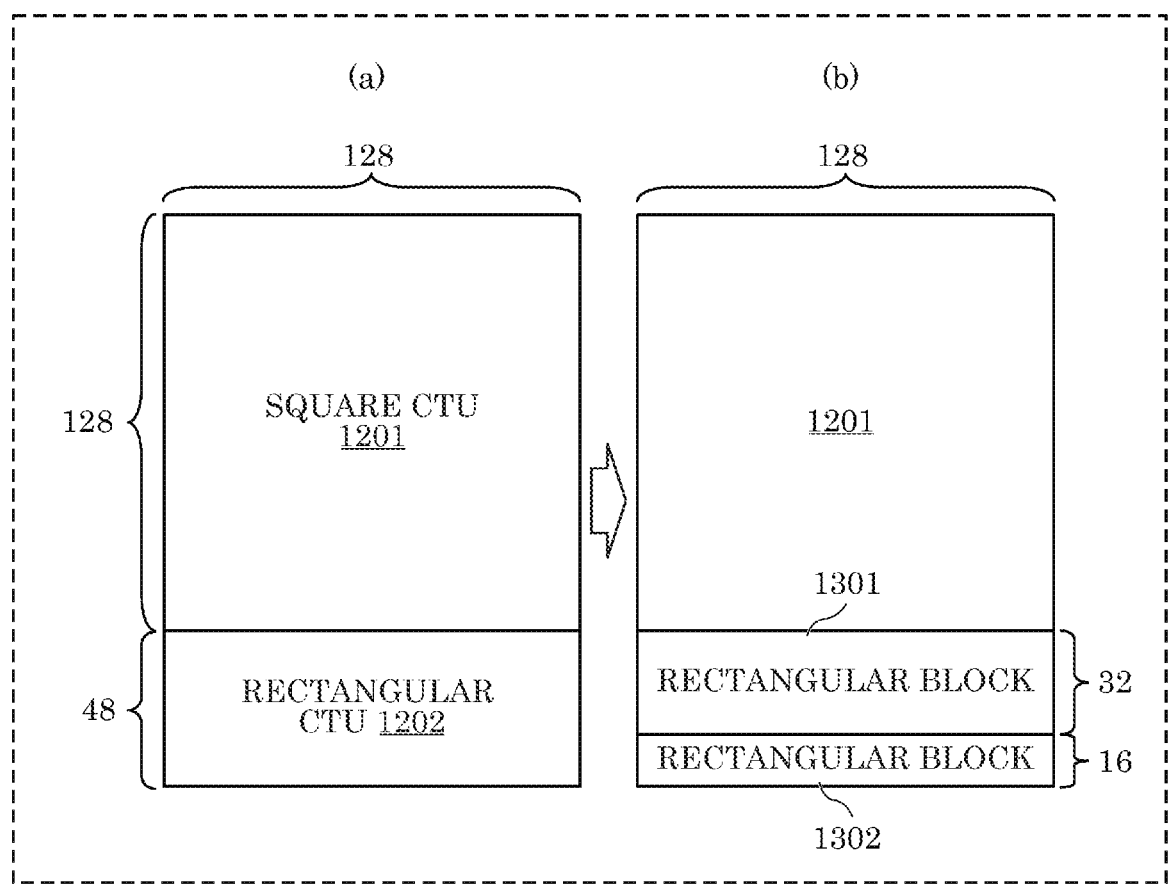
FIG. 13 illustrates one example of the first partitioning according to Variation 1 of Embodiment 1.

Next, example 2 of the first partitioning will be described with reference to FIG. 13. FIG. 13 illustrates an example of the first partitioning according to Variation 1 of Embodiment 1.

As illustrated in (a) in FIG. 13, rectangular CTU 1202 sized 48×128 pixels is generated at the lower edge of the picture, as is the case illustrated in FIG. 12. In the present example, rectangular CTU 1202 is partitioned into rectangular blocks each having a side whose length is the integer power of 2, as illustrated in (b) in FIG. 13. Here, it is desirable that a rectangular block located closer to the lower edge of the picture has shorter sides.

Since the shorter side of rectangular CTU 1202 is 48 pixels (=32 (the fifth power of 2)+16 (the fourth power of 2), rectangular CTU 1202 is partitioned into rectangular block 1301 sized 32×128 pixels and rectangular block 1302 sized 16×128 pixels. Though FIG. 13 illustrates an example of partitioning a rectangular CTU into rectangular blocks only, the rectangular CTU may be partitioned into both rectangular blocks and square blocks.

Example 3 of First Partitioning

Figure 14:
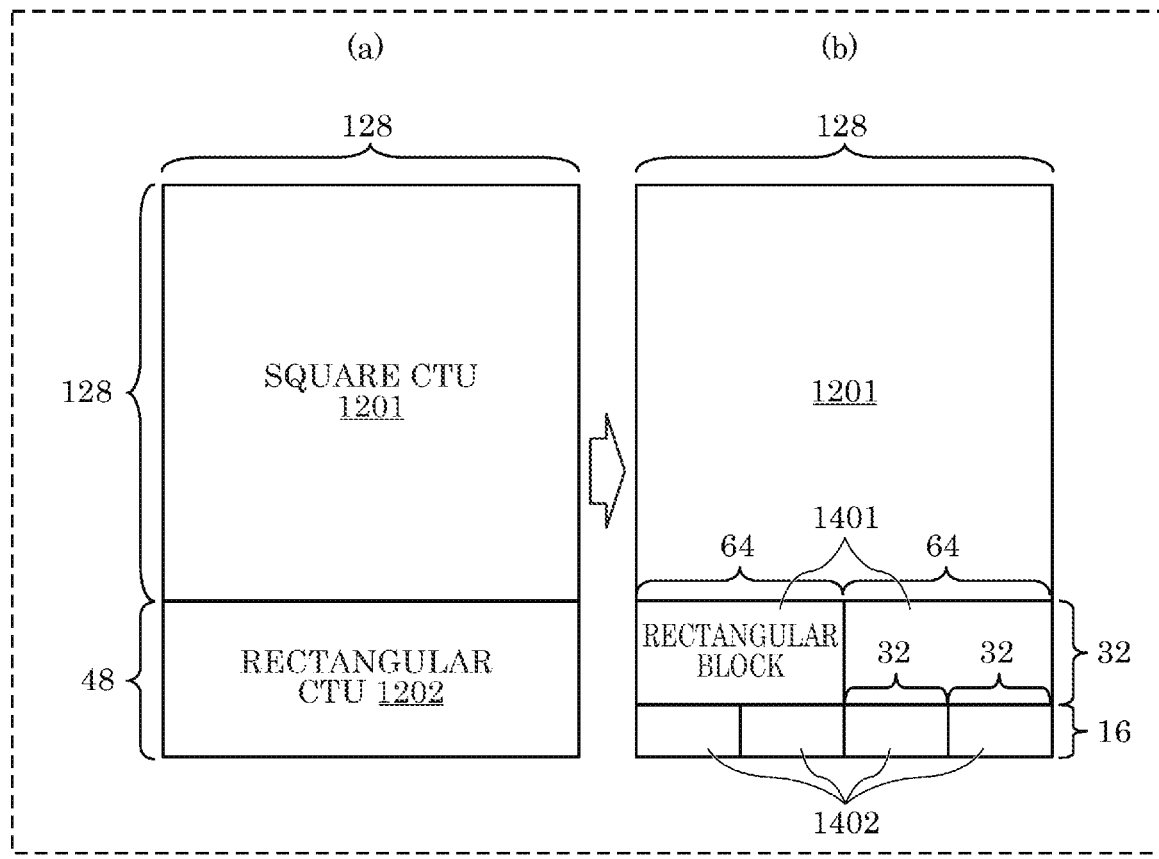
FIG. 14 illustrates one example of the first partitioning according to Variation 1 of Embodiment 1.

Next, example 3 of the first partitioning will be described with reference to FIG. 14. FIG. 14 illustrates an example of the first partitioning according to Variation 1 of Embodiment 1.

Though in the above-described example 2, the length of the longer side of a rectangular block in a rectangular CTU (128 pixels) is the same as that of a side of a square CTU, this is not necessarily the case in other examples. The length of a side of the rectangular block needs to be the integer power of 2 and does not need to be the same as that of the side of the square CTU.

For example, rectangular CTU 1202 may be partitioned into two rectangular blocks 1401 sized 32×64 pixels and four rectangular blocks 1402 sized 16×32 pixels, as illustrated in (b) in FIG. 14. The example shows the case where the longer side of a rectangular block is the integer-power-of-2 times as long as the shorter side of the rectangular block, and in particular, the ratio of shorter side:longer side=1:2.

Note that when a rectangular CTU is partitioned into rectangular blocks, the aspect ratio of a rectangular block may be set not to exceed a defined value. In other words, the upper limit may be set for the length of the longer side with respect to the length of the shorter side.

Note that in the above-described examples 1 through 3, rectangular CTU 1202 is located at the lower edge of the picture, but may be located anywhere in the picture, e.g., at the right edge, at the upper edge, or in the center of the picture.

Advantageous Effects

As described above, according to the present variation, since flexibility is added in terms of shapes usable in a block splitting process in the first partitioning, coding efficiency may improve.

According to the present variation, it is possible to automatically exclude an extremely elongated block shape in the first partitioning, to simplify a flag used to indicate a block structure, which may facilitate reducing the encoding load (the amount of information to be encoded).

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Variation 2 of Embodiment 1

Next, Variation 2 of Embodiment 1 will be described. The present variation differs from the above-described Embodiment 1 and Variation 1 thereof in that a quadtree splitting is prohibited in rectangular CTUs or rectangular blocks in the second partitioning. Hereinafter, the present variation is described in detail with reference to FIGS. 15 and 16 by mainly focusing on the points different from the above-described Embodiment 1 and Variation 1 thereof.

Note that the configuration of an encoder is the same as that illustrated in the above-described Embodiment 1. Accordingly, duplicate depiction and description are omitted.

[Process Performed by Splitter]

Figure 15:
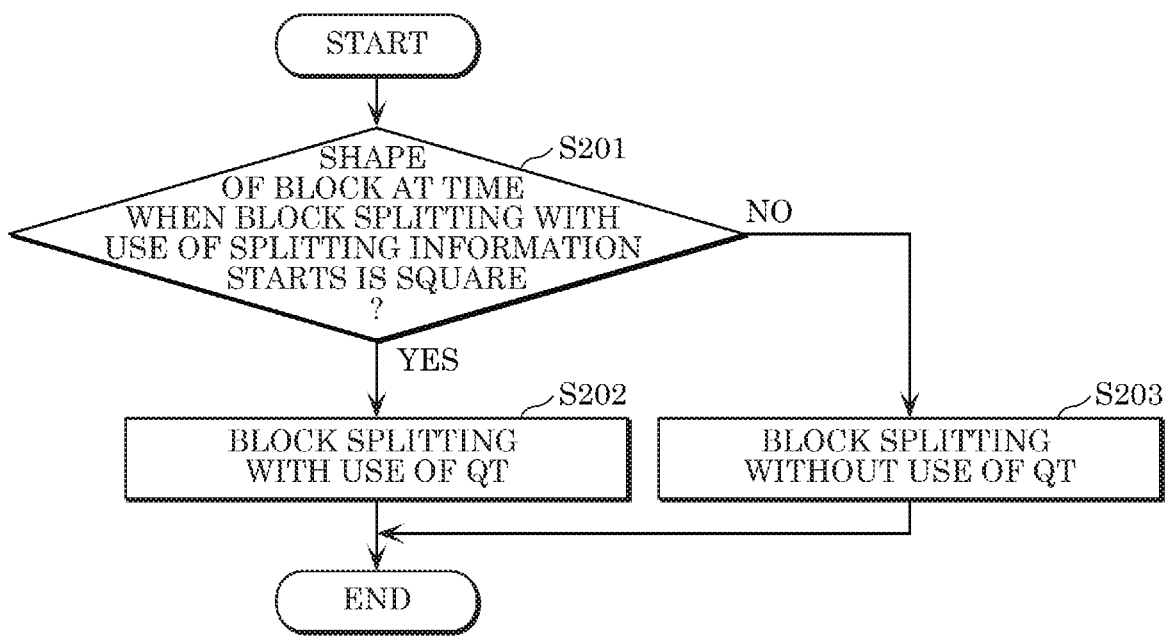
FIG. 15 is a flowchart illustrating a process performed by a splitter according to Variation 2 of Embodiment 1.

FIG. 15 is a flowchart illustrating an example of a process performed by splitter 102 according to Variation 2 of Embodiment 1. Specifically, FIG. 15 illustrates some details of the second partitioning illustrated in FIG. 11. FIG. 15 describes the case where step S114 in FIG. 11 is not performed. In other words, FIG. 15 illustrates a case wherein the second partitioning is performed on square CTUs and rectangular CTUs obtained as a result of the first partitioning.

First, splitter 102 determines whether a CTU to be subjected to the second partitioning (hereinafter referred to as a target CTU) is a square (S201). When the target CTU is a square (YES at S201), splitter 102 allows a quadtree splitting (QT) in the second partitioning performed on the target CTU (S202). On the other hand, when the target CTU is not a square (NO at S201), splitter 102 prohibits QT in the second partitioning performed on the target CTU (S203).

Example of Second Partitioning

Figure 16:
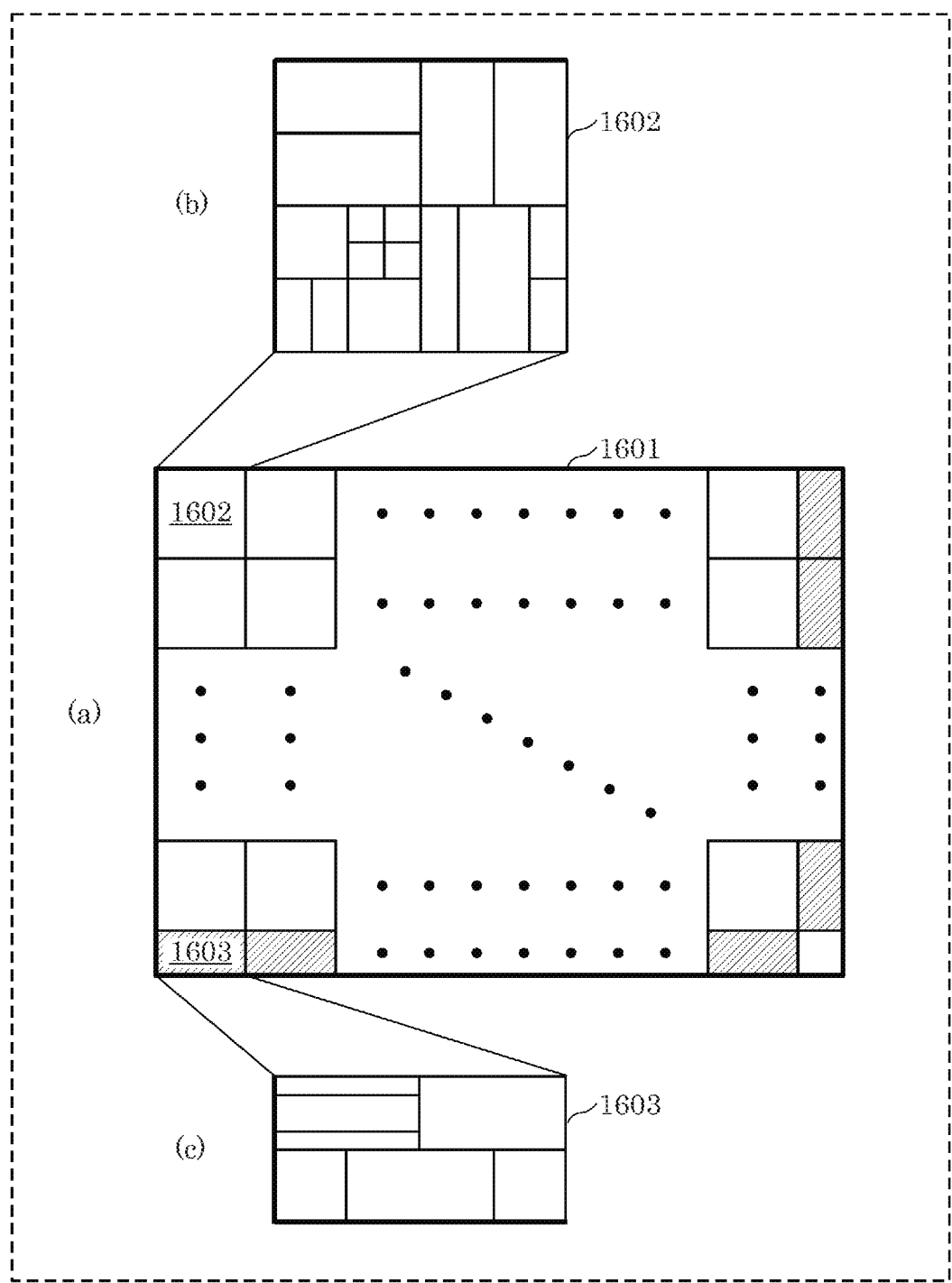
FIG. 16 illustrates examples of the first partitioning and a second partitioning in a picture according to Variation 2 of Embodiment 1.

An example of the second partitioning will be described herein with reference to FIG. 16. FIG. 16 illustrates examples of the first partitioning and the second partitioning performed on picture 1601 according to Variation 2 of Embodiment 1.

(a) in FIG. 16 illustrates a result of the first partitioning performed on picture 1601. Picture 1601 is partitioned into a plurality of CTUs including square CTUs 1602 and rectangular CTUs 1603. (b) in FIG. 16 illustrates a result of the second partitioning performed on square CTU 1602. (c) in FIG. 16 illustrates a result of the second partitioning performed on rectangular CTU 1603.

In the present example, a quadtree splitting in the second partitioning is prohibited for rectangular CTUs (hatched blocks) 1603 that are in contact with the edge of picture 1601. On the other hand, a quadtree splitting in the second partitioning may be allowed to be performed on rectangular CTUs (not indicated in the drawing) that are not in contact with the edge of picture 1601.

First, QT is recursively performed, and a binary tree splitting (BT) or a ternary tree splitting (TT) is subsequently performed on square CTU 1602 in (b) in FIG. 16. In other words, QT is allowed to be performed on square CTU 1602.

It may be defined that the use of QT is prohibited on any node that has been subjected to any splitting process other than QT (BT or TT in this case) even once.

QT is prohibited and only BT and TT are allowed to be performed on rectangular CTU 1603 in (c) in FIG. 16.

Advantageous Effects

According to the present variation, since there is no need to support the quadtree splitting of rectangular CTUs or rectangular blocks in the second partitioning, processing may become simpler. Furthermore, by prohibiting a quadtree splitting for rectangular CTUs or rectangular blocks, the number of splitting process candidates decreases (e.g., to only BT and TT), which may facilitate reducing the encoding load (the amount of information to be encoded) for the second partitioning.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Other Variations of Embodiment 1

Note that the partitioning of rectangular CTUs in the first partitioning (Variation 1) and the prohibition of QT on rectangular CTUs in the second partitioning (Variation 2) may be switched on or off per picture, slice, tile, or CTU. In this case, the switching on or off of the partitioning and the prohibition may be determined based on a picture type (e.g., I, P, or B picture), a luma value (luminance), a chroma value (chrominance), or any combination thereof.

With an encoding method incapable of performing a rectangular splitting, it is possible to prohibit the second partitioning of rectangular CTUs or rectangular blocks obtained as a result of the first partitioning. For example, when use of BT and TT (both of which are rectangular splitting methods) is prohibited, the second partitioning of rectangular CTUs or rectangular blocks may be prohibited. The prohibition of use of BT and TT may be set, for example, using flag information included in a header layer.

The second partitioning of rectangular CTUs or rectangular blocks generated in the first partitioning may be allowed only at a right edge or a lower edge of a picture. The flag information indicating whether to allow the second partitioning of the rectangular CTUs or rectangular blocks generated in the first partitioning may be added into a bitstream.

With an encoding method incapable of performing a rectangular splitting, it is possible to prohibit generation of rectangular blocks in the first partitioning of rectangular CTUs, allowing generation of only square blocks in the first partitioning of rectangular CTUs (see step S114 in FIG. 11).

The upper limit of the depth of a partition tree allowed in the second partitioning may be changed according to the shape of a block at the time when the second partitioning starts. The upper limit of the depth of a partition tree may be defined separately for a horizontal direction and a vertical direction, respectively.

The prohibition of a quadtree splitting of rectangular blocks in the second partitioning may be applied not only to blocks at the time when the second partitioning starts, but also to blocks that are newly split in the second partitioning. For example, when a rectangular block is generated in the second partitioning, (i) if the rectangular block is in contact with an edge of a picture, a quadtree splitting of the rectangular block may be prohibited; and (ii) if the rectangular block is not in contact with an edge of the picture, a quadtree splitting of the rectangular block may be allowed.

Figure 17:
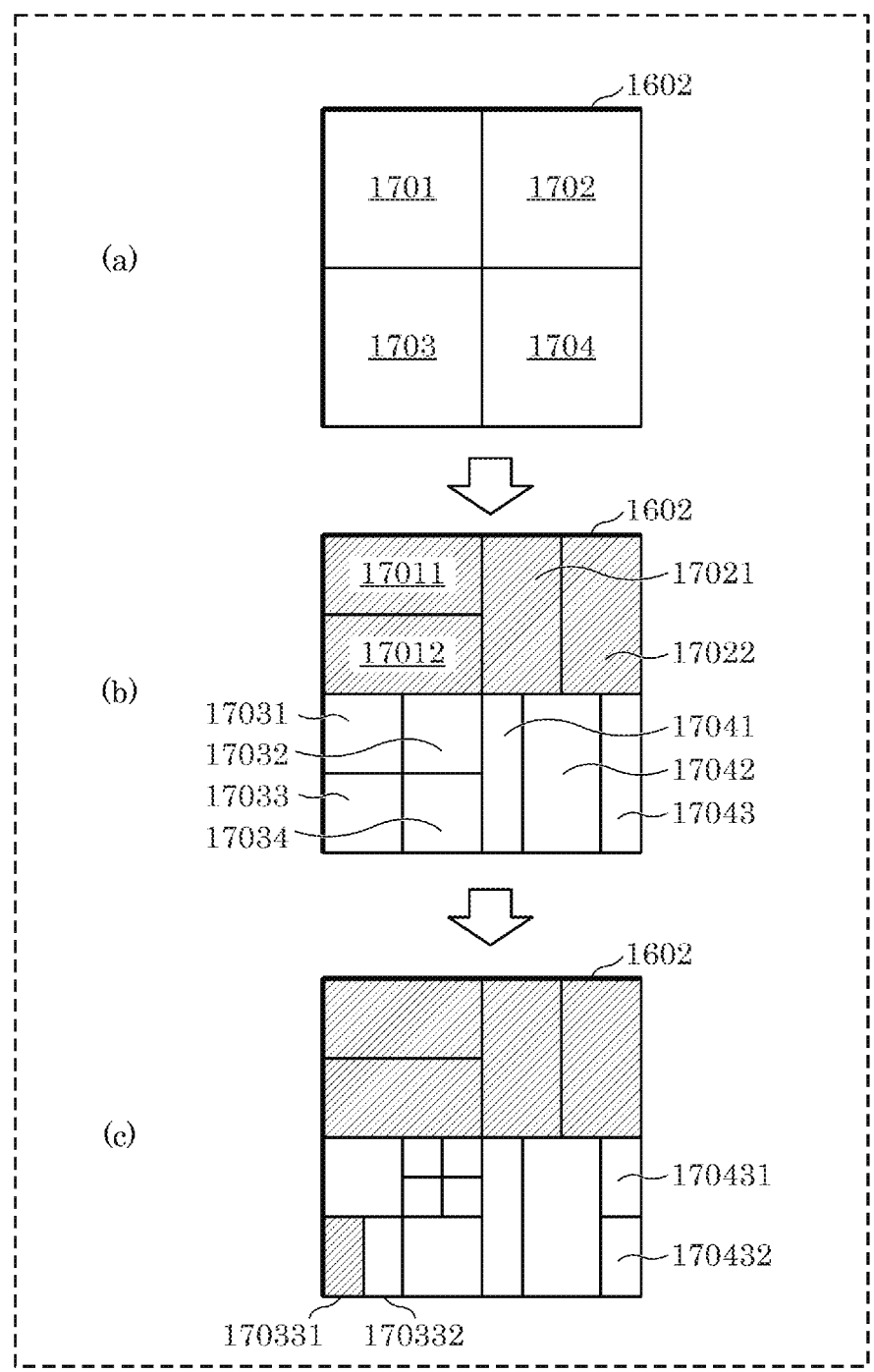
FIG. 17 illustrates one example of the second partitioning of square coding tree units (CTUs) according to another variation of Embodiment 1.
Figure 18:
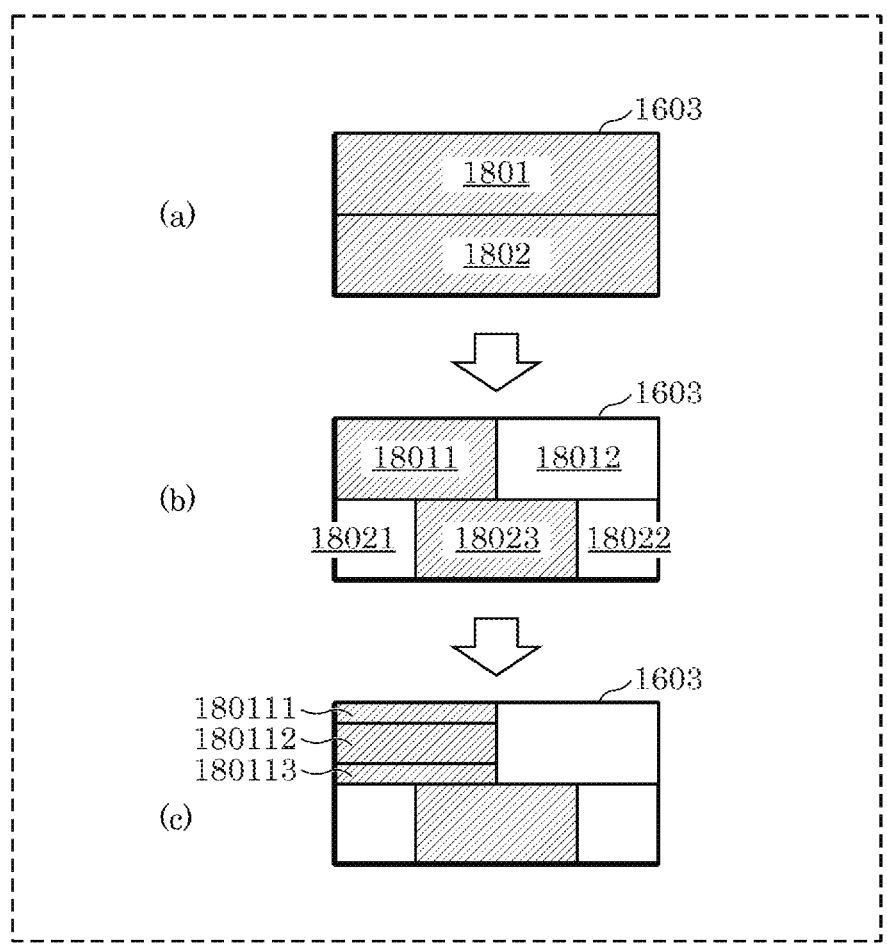
FIG. 18 illustrates one example of the second partitioning of rectangular CTUs according to another variation of Embodiment 1.

The prohibition of a quadtree splitting of rectangular blocks generated during the second partitioning will be described with reference to FIGS. 17 and 18. FIG. 17 illustrates an example of the second partitioning of square CTUs according to another variation of Embodiment 1. FIG. 18 illustrates an example of the second partitioning of rectangular CTUs according to another variation of Embodiment 1. Note that the hatched blocks in FIGS. 17 and 18 are rectangular blocks for which a quadtree splitting is prohibited.

In (a) in FIG. 17, square CTU 1602 is split into four square blocks 1701 through 1704 using a quadtree splitting.

In (b) in FIG. 17, four square blocks 1701 through 1704 are each split. Specifically, square block 1701 is split into two rectangular blocks 17011 and 17012 in a horizontal direction using a binary tree splitting. Square block 1702 is split into two rectangular blocks 17021 and 17022 in a vertical direction using a binary tree splitting. Square block 1703 is split into four square blocks 17031 through 17034 using a quadtree splitting. Square block 1704 is split into three rectangular blocks 17041 through 17043 in the vertical direction using a ternary tree splitting.

Note that in (b) in FIG. 17, since rectangular blocks 17011, 17012, 17021, and 17022 are in contact with the edge of the picture (e.g., a left edge and an upper edge as indicated in bold lines in FIG. 17), a quadtree splitting is prohibited in the subsequent splitting processes. On the other hand, since rectangular blocks 17041 through 17043 are not in contact with the edge of the picture, a quadtree splitting is allowed in the subsequent splitting processes.

In (c) in FIG. 17, square blocks 17032 and 17033, and rectangular block 17043 are each split while the other blocks are not split. Square block 17032 is split into four square blocks using a quadtree splitting. Square block 17033 is split into two rectangular blocks 170331 and 170332 in the vertical direction using a binary tree splitting. Rectangular block 17043 is split into two rectangular blocks 170431 and 170432 in the horizontal direction using a binary tree splitting.

Note that in (c) in FIG. 17, since rectangular block 170331 is in contact with the edge of the picture (e.g., the left edge in FIG. 17), a quadtree splitting is prohibited in the subsequent splitting processes. On the other hand, since rectangular blocks 170332, 170431, and 170432 are not in contact with the edge of the picture, a quadtree splitting is allowed in the subsequent splitting processes.

Thus, square CTU 1602 is recursively split into a plurality of blocks through the processes illustrated in (a) through (c) in FIG. 17.

In (a) in FIG. 18, rectangular CTU 1603 is split into two rectangular blocks 1801 and 1802 in a horizontal direction using a binary tree splitting.

In (b) in FIG. 18, two rectangular blocks 1801 and 1802 are each split. Rectangular block 1801 is split into two rectangular blocks 18011 and 18012 in a vertical direction using a binary tree splitting. Rectangular block 1802 is split into two square blocks 18021 and 18022 and rectangular block 18023 in the vertical direction using a ternary tree splitting.

Note that in (b) in FIG. 18, since rectangular blocks 18011 and 18023 are in contact with the edge of the picture (e.g., a left edge and a lower edge as indicated in bold lines in FIG. 18), a quadtree splitting is prohibited in the subsequent splitting processes. On the other hand, since rectangular block 18012 is not in contact with the edge of the picture, a quadtree splitting is allowed in the subsequent splitting processes. In addition, since square blocks 18021 and 18022 are not rectangular blocks, a quadtree splitting is allowed in the subsequent splitting processes.

In (c) in FIG. 18, only rectangular block 18011 is split among the blocks generated in the splitting illustrated in (b), and the other blocks are not split. Rectangular block 18011 is split into three rectangular blocks 180111 through 180113 in the horizontal direction using a ternary tree splitting.

Since three rectangular blocks 180111 through 180113 are in contact with the edge of the picture, a quadtree splitting is prohibited in the subsequent splitting processes.

As described above, in the case where a rectangular block is generated in the second partitioning, (i) when the rectangular block is in contact with an edge of a picture, a quadtree splitting of the rectangular block is prohibited, and (ii) when the rectangular block is not in contact with an edge of the picture, the quadtree splitting of the rectangular block is allowed. This makes it possible to reduce the number of splitting process candidates for rectangular blocks in the second partitioning (e.g., allowing only BT and TT), which may facilitate reducing the processing load and the encoding load (the amount of information to be encoded) for the second partitioning.

Note that each of the aforementioned variations has illustrated a block splitting process performed by splitter 102 in encoder 100, but decoder 200 may include a similar splitter to perform the same first and second partitioning as performed by the encoder. In other words, the block splitting may be performed also by a splitter in decoder 200, as is performed by splitter 102 in encoder 100.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Other Embodiments

Implementations and Applications

As described in each of the above embodiments, each functional or operational block may typically be realized as an MPU and memory, for example. Moreover, processes performed by each of the functional blocks may be realized as a program execution unit, such as a processor which reads and executes software (a program) recorded on a recording medium such as ROM. The software may be distributed and, for example, downloaded. The software may be recorded on a recording media such as semiconductor memory. Note that each functional block can also be realized as hardware (dedicated circuit).

The processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture (video) encoding method (image encoding method) and the moving picture decoding method (image decoding method) described in each of the above embodiments will be described, as well as various systems that implement the application examples. Such a system may be characterized as including an image encoder that employs the image encoding method, an image decoder that employs the image decoding method, or an image encoder/decoder that includes both the image encoder and the image decoder. Other configurations of such a system may be modified on a case-by-case basis.

Usage Examples

FIG. 17 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations in the illustrated example, are located in respective cells.

In content providing system ex100, devices including computer ex111, gaming device ex112, camera ex113, home appliance ex114, and smartphone ex115 are connected to Internet ex101 via Internet service provider ex102 or communications network ex104 and base stations ex106 through ex110. Content providing system ex100 may combine and connect any combination of the above elements. In various implementations, the devices may be directly or indirectly connected together via a telephone network or near field communication, rather than via base stations ex106 through ex110. Further, streaming server ex103 may be connected to devices including computer ex111, gaming device ex112, camera ex113, home appliance ex114, and smartphone ex115 via, for example, Internet ex101. Streaming server ex103 may also be connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via Internet ex101 or Internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) may perform the encoding processing described in the above embodiments on still-image or video content captured by a user via the terminal, may multiplex video data obtained via the encoding and audio data obtained by encoding audio corresponding to the video, and may transmit the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data may decode and reproduce the received data. In other words, the devices may each function as the image decoder, according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client may be dynamically assigned to the client. Content is cached and streamed to the edge server to reduce load times. In the event of, for example, some type of error or change in connectivity due, for example, to a spike in traffic, it is possible to stream data stably at high speeds, since it is possible to avoid affected parts of the network by, for example, dividing the processing between a plurality of edge servers, or switching the streaming duties to a different edge server and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing which maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount (an amount of features or characteristics) from an image, compresses data related to the feature amount as metadata, and transmits the compressed metadata to a server. For example, the server determines the significance of an object based on the feature amount, and changes the quantization accuracy accordingly to perform compression suitable for the meaning (or content significance) of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding which has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Furthermore, the server may stream video data after performing transcoding to convert the encoding format of the video data. For example, the server may convert the encoding format from MPEG to VP, may convert H.264 to H.265, etc.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

There has been an increase in usage of images or videos combined from images or videos of different scenes concurrently captured, or of the same scene captured from different angles, by a plurality of terminals such as camera ex113 and/or smartphone ex115. Videos captured by the terminals may be combined based on, for example, the separately-obtained relative positional relationship between the terminals, or regions in a video having matching feature points.

In addition to the encoding of two-dimensional moving pictures, the server may encode a still image based on scene analysis of a moving picture, either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud and, based on a result of recognizing or tracking a person or object using three-dimensional data, may select or reconstruct and generate a video to be transmitted to a reception terminal, from videos captured by a plurality of terminals.

This allows the user to enjoy a scene by freely selecting videos corresponding to the video capturing terminals, and allows the user to enjoy the content obtained by extracting a video at a selected viewpoint from three-dimensional data reconstructed from a plurality of images or videos. Furthermore, as with video, sound may be recorded from relatively different angles, and the server may multiplex audio from a specific angle or space with the corresponding video, and transmit the multiplexed video and audio.

In recent years, content that is a composite of the real world and a virtual world, such as virtual reality (VR) and augmented reality (AR) content, has also become popular. In the case of VR images, the server may create images from the viewpoints of both the left and right eyes, and perform encoding that tolerates reference between the two viewpoint images, such as multi-view coding (MVC), and, alternatively, may encode the images as separate streams without referencing. When the images are decoded as separate streams, the streams may be synchronized when reproduced, so as to recreate a virtual three-dimensional space in accordance with the viewpoint of the user.

In the case of AR images, the server may superimpose virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information. The server may generate superimposed data based on three-dimensional data stored in the server in accordance with the received motion, and encode and stream the generated superimposed data to the decoder. Note that superimposed data typically includes, in addition to RGB values, an $\alpha$ value indicating transparency, and the server sets the $\alpha$ value for sections other than the object generated from three-dimensional data to, for example, 0, and may perform the encoding while those sections are transparent. Alternatively, the server may set the background to a determined RGB value, such as a chroma key, and generate data in which areas other than the object are set as the background. The determined RGB value may be predetermined.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In situations in which a plurality of wireless connections are possible over near, mid, and far distances, indoors or outdoors, it may be possible to seamlessly receive content using a streaming system standard such as MPEG-DASH. The user may switch between data in real time while freely selecting a decoder or display apparatus including the user's terminal, displays arranged indoors or outdoors, etc. Moreover, using, for example, information on the position of the user, decoding can be performed while switching which terminal handles decoding and which terminal handles the displaying of content. This makes it possible to map and display information, while the user is on the move in route to a destination, on the wall of a nearby building in which a device capable of displaying content is embedded, or on part of the ground. Moreover, it is also possible to switch the bit rate of the received data based on the accessibility to the encoded data on a network, such as when encoded data is cached on a server quickly accessible from the reception terminal, or when encoded data is copied to an edge server in a content delivery service.

[Scalable Encoding]

The switching of content will be described with reference to a scalable stream, illustrated in FIG. 18, which is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 18. Note that there may be a plurality of individual streams that are of the same content but different quality. In other words, by determining which layer to decode based on internal factors, such as the processing ability on the decoder side, and external factors, such as communication bandwidth, the decoder side can freely switch between low resolution content and high resolution content while decoding. For example, in a case in which the user wants to continue watching, for example at home on a device such as a TV connected to the Internet, a video that the user had been previously watching on smartphone ex115 while on the move, the device can simply decode the same stream up to a different layer, which reduces server side load.

Furthermore, in addition to the configuration described above in which scalability is achieved as a result of the pictures being encoded per layer, with the enhancement layer being above the base layer, the enhancement layer may include metadata based on, for example, statistical information on the image. The decoder side may generate high image quality content by performing super-resolution imaging on a picture in the base layer based on the metadata. Super-resolution imaging may improve the SN ratio while maintaining resolution and/or increasing resolution. Metadata includes information for identifying a linear or a non-linear filter coefficient used in super-resolution processing, or information identifying a parameter value in filter processing, machine learning, or a least squares method used in super-resolution processing.

Figure 19:
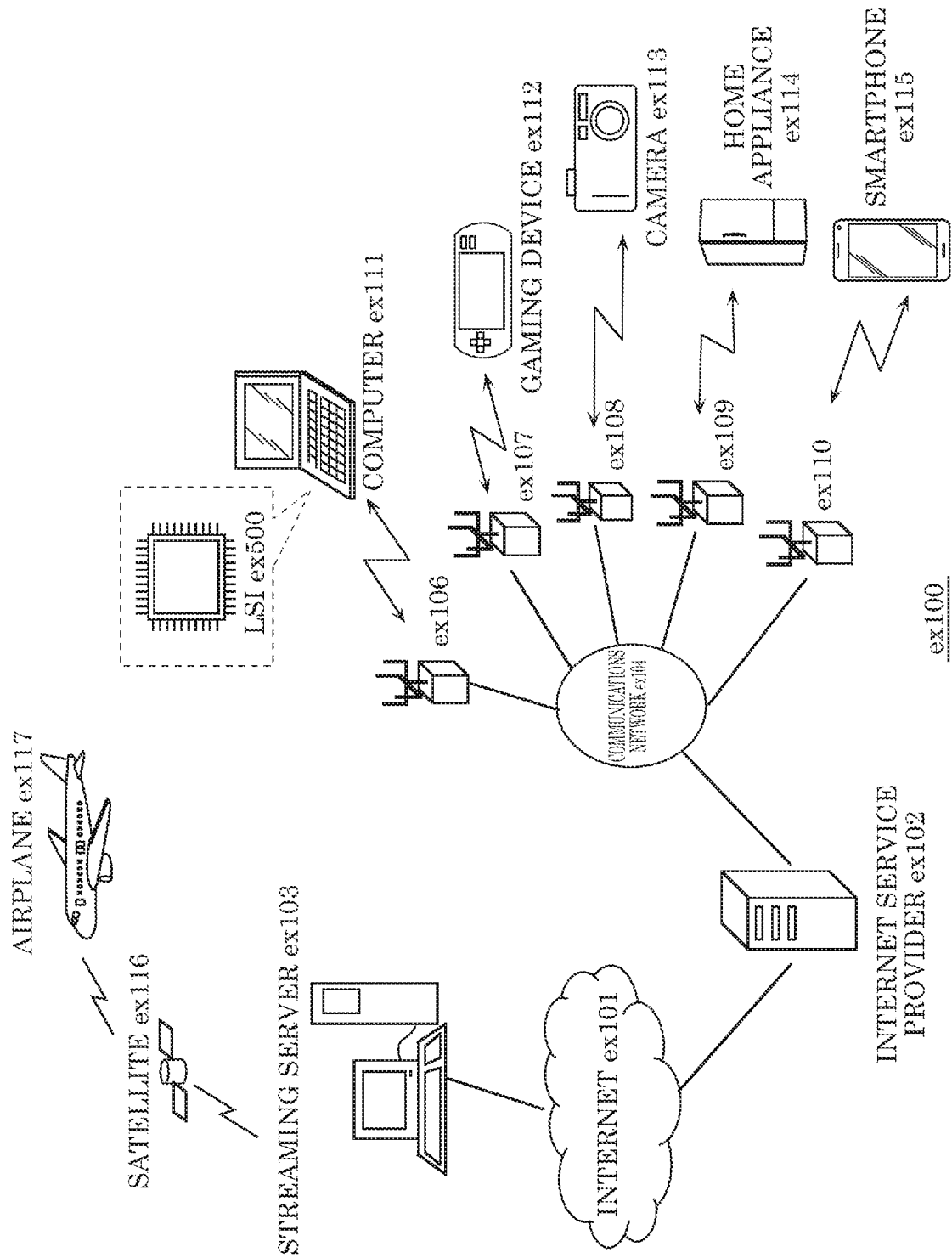
FIG. 19 is a block diagram illustrating an overall configuration of a content providing system for implementing a content distribution service.

Alternatively, a configuration may be provided in which a picture is divided into, for example, tiles in accordance with, for example, the meaning of an object in the image. On the decoder side, only a partial region may be decoded by selecting a tile to decode. Further, by storing an attribute of the object (person, car, ball, etc.) and a position of the object in the video (coordinates in identical images) as metadata, the decoder side can identify the position of a desired object based on the metadata, and determine which tile or tiles include that object. For example, as illustrated in FIG. 19, metadata may be stored using a data storage structure different from pixel data, such as an SEI (supplemental enhancement information) message in HEVC. This metadata indicates, for example, the position, size, or color of the main object.

Metadata may be stored in units of a plurality of pictures, such as stream, sequence, or random access units. The decoder side can obtain, for example, the time at which a specific person appears in the video, and by fitting the time information with picture unit information, can identify a picture in which the object is present, and can determine the position of the object in the picture.

[Web Page Optimization]

Figure 20:
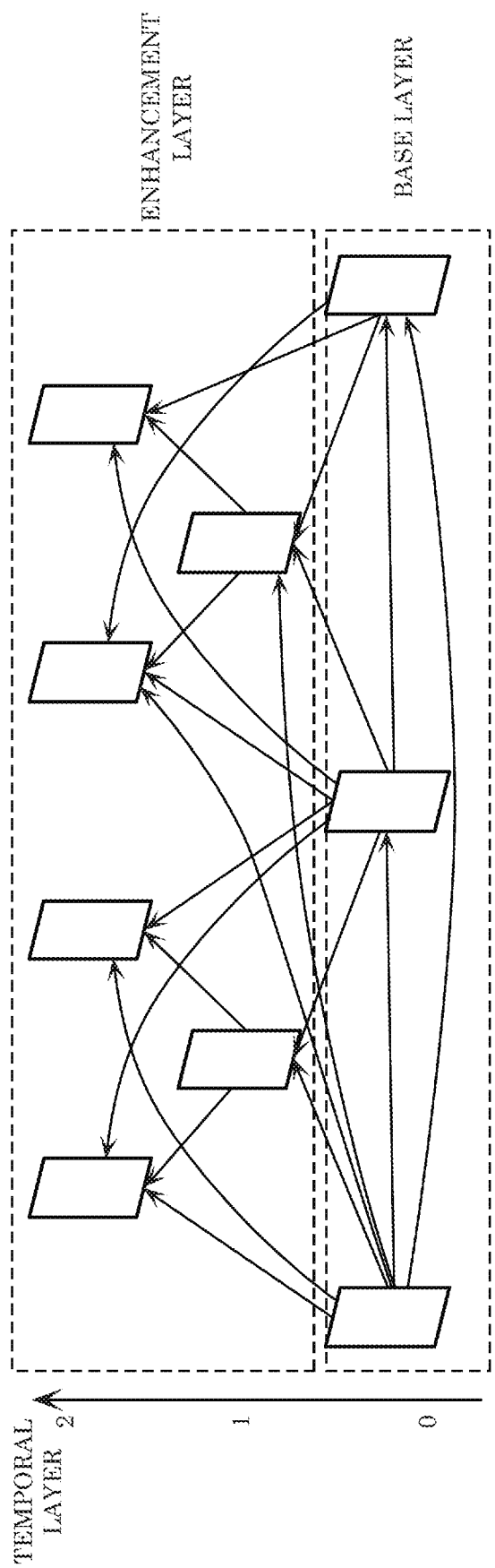
FIG. 20 is a conceptual diagram illustrating one example of an encoding structure in scalable encoding.
Figure 21:
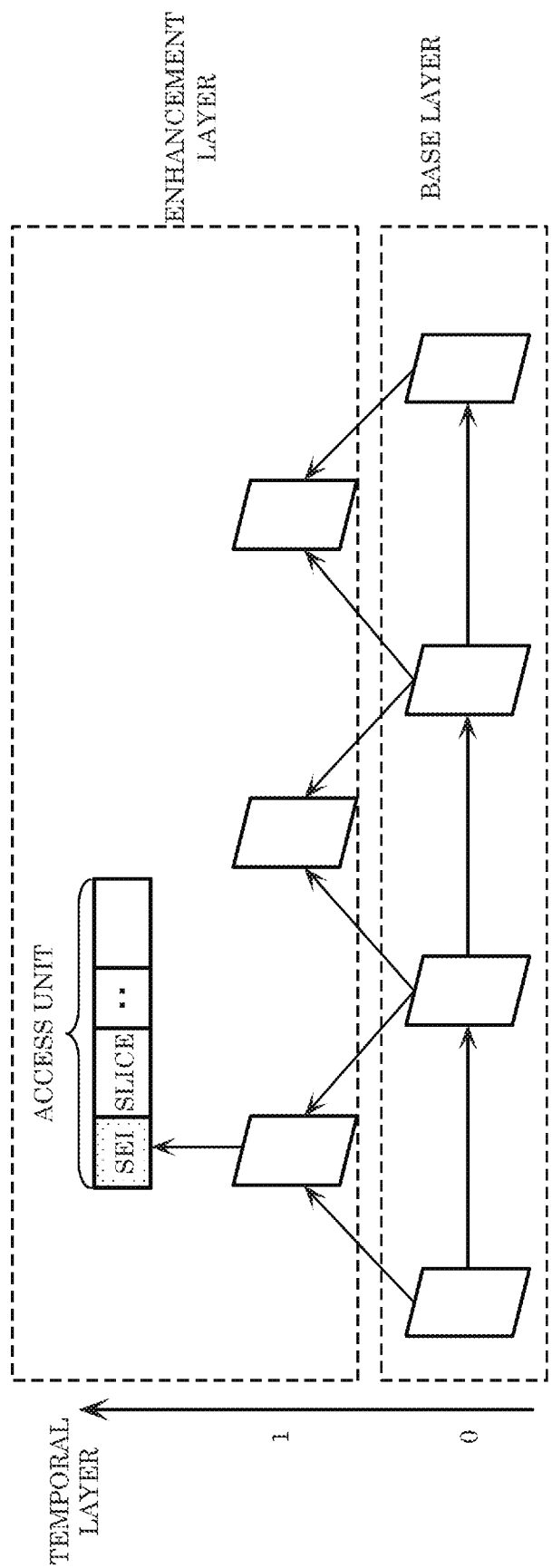
FIG. 21 is a conceptual diagram illustrating one example of an encoding structure in scalable encoding.

FIG. 20 illustrates an example of a display screen of a web page on computer ex111, for example. FIG. 21 illustrates an example of a display screen of a web page on smartphone ex115, for example. As illustrated in FIG. 20 and FIG. 21, a web page may include a plurality of image links that are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) may display, as the image links, still images included in the content or I pictures; may display video such as an animated gif using a plurality of still images or I pictures; or may receive only the base layer, and decode and display the video.

When an image link is selected by the user, the display apparatus decodes while, for example, giving the highest priority to the base layer. Note that if there is information in the HTML code of the web page indicating that the content is scalable, the display apparatus may decode up to the enhancement layer. Further, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Still further, the display apparatus may purposely ignore the reference relationship between pictures, and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal may seamlessly receive and decode while switching between base stations among base stations ex106 through ex110 by transmitting information indicating the position of the reception terminal. Moreover, in accordance with the selection made by the user, the situation of the user, and/or the bandwidth of the connection, the reception terminal may dynamically select to what extent the metadata is received, or to what extent the map information, for example, is updated.

In content providing system ex100, the client may receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, and short content from an individual are also possible. Such content from individuals is likely to further increase in popularity. The server may first perform editing processing on the content before the encoding processing, in order to refine the individual content. This may be achieved using the following configuration, for example.

In real time while capturing video or image content, or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

There may be instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, may apply a mosaic filter, for example, to the face of the person. Alternatively, as pre- or post-processing for encoding, the user may specify, for copyright reasons, a region of an image including a person or a region of the background to be processed. The server may process the specified region by, for example, replacing the region with a different image, or blurring the region. If the region includes a person, the person may be tracked in the moving picture, and the person's head region may be replaced with another image as the person moves.

Since there is a demand for real-time viewing of content produced by individuals, which tends to be small in data size, the decoder may first receive the base layer as the highest priority, and perform decoding and reproduction, although this may differ depending on bandwidth. When the content is reproduced two or more times, such as when the decoder receives the enhancement layer during decoding and reproduction of the base layer, and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Implementation and Application Examples

The encoding and decoding may be performed by LSI (large scale integrated circuitry) ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data may be coded by LSI ex500 included in smartphone ex115.

Note that LSI ex500 may be configured to download and activate an application. In such a case, the terminal first determines whether it is compatible with the scheme used to encode the content, or whether it is capable of executing a specific service. When the terminal is not compatible with the encoding scheme of the content, or when the terminal is not capable of executing a specific service, the terminal first downloads a codec or application software then obtains and reproduces the content.

Aside from the example of content providing system ex100 that uses Internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 22:
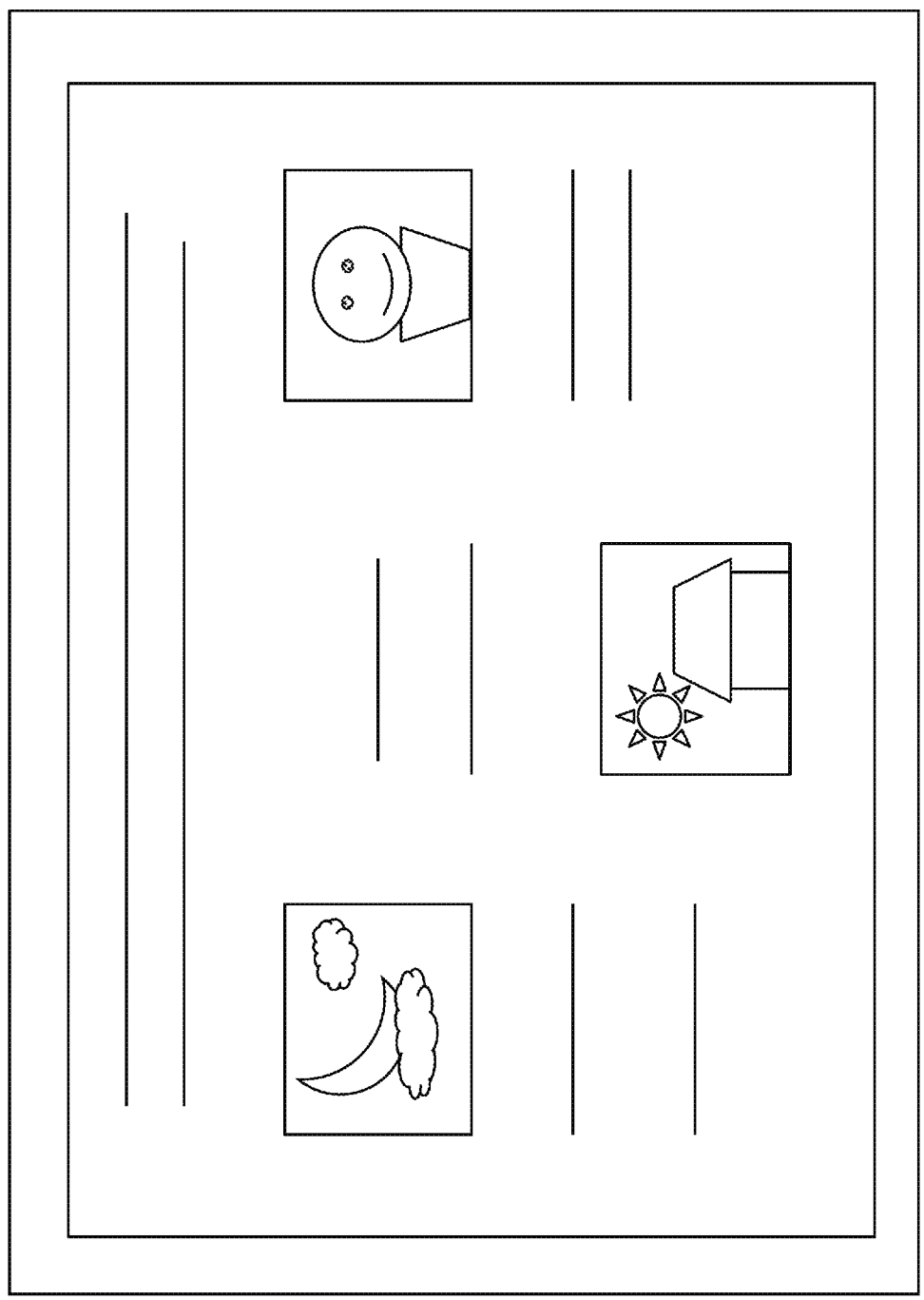
FIG. 22 is a conceptual diagram illustrating an example of a display screen of a web page.
Figure 23:
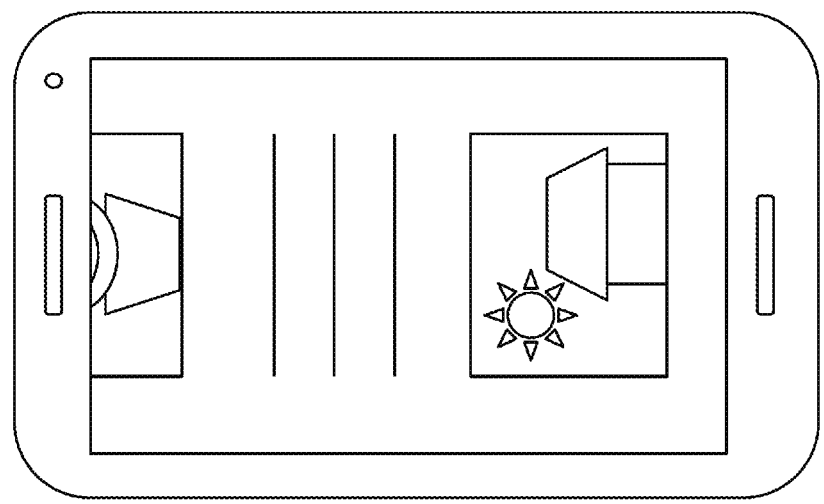
FIG. 23 is a conceptual diagram illustrating an example of a display screen of a web page.
Figure 24:
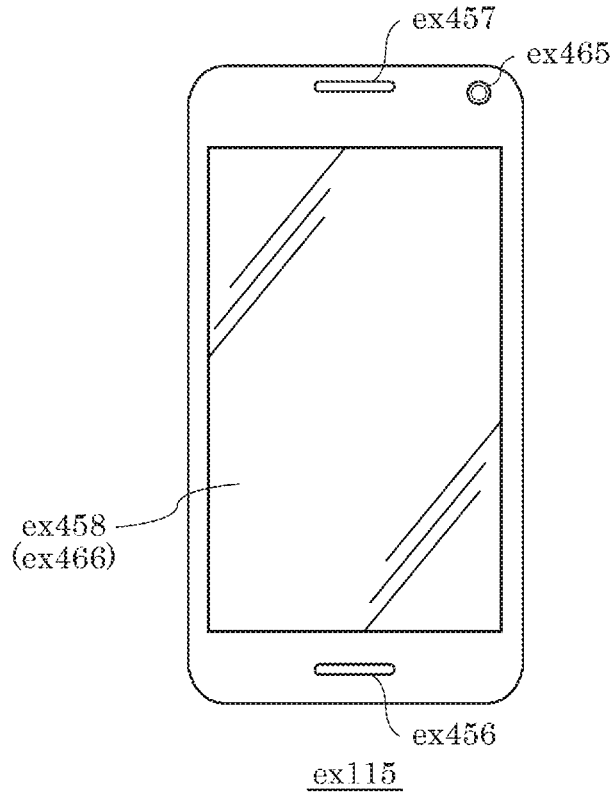
FIG. 24 is a block diagram illustrating one example of a smartphone.
Figure 25:
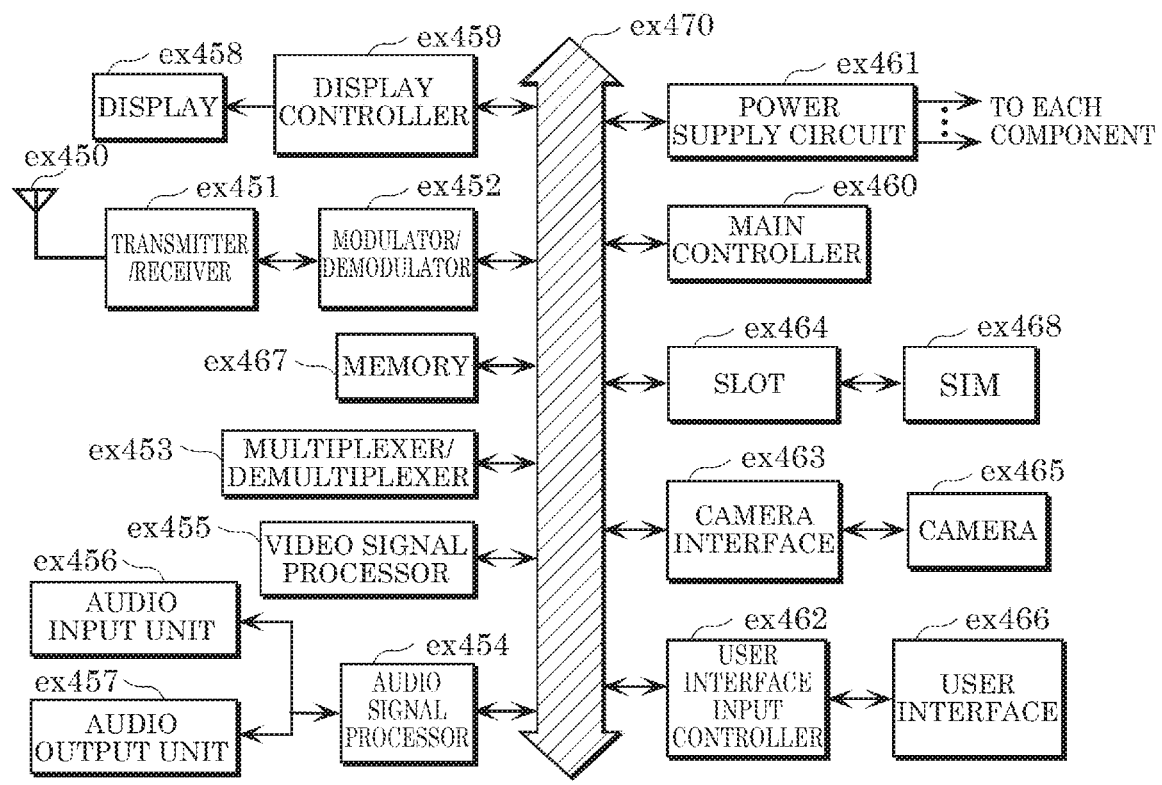
FIG. 25 is a block diagram illustrating a configuration example of a smartphone.

FIG. 22 illustrates smartphone ex115. FIG. 23 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Main controller ex460, which may comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns on the power button of power supply circuit ex461, smartphone ex115 is powered on into an operable state, and each component is supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, to which spread spectrum processing is applied by modulator/demodulator ex452, and digital-analog conversion and frequency conversion processing are applied by transmitter/receiver ex451, and the resulting signal is transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 based on operation of user interface ex466 of the main body, for example. Similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Audio signal processor ex454 encodes an audio signal recorded by audio input unit ex456 while camera ex465 is capturing a video or still image, and transmits the encoded audio data to multiplexer/demultiplexer ex453.

Multiplexer/demultiplexer ex453 multiplexes the encoded video data and encoded audio data using a determined scheme, modulates and converts the data using modulator/demodulator (modulator/demodulator circuit) ex452 and transmitter/receiver ex451, and transmits the result via antenna ex450. The determined scheme may be predetermined When video appended in an email or a chat, or a video linked from a web page, is received, for example, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Audio signal processor ex454 decodes the audio signal and outputs audio from audio output unit ex457. Since real-time streaming is becoming increasing popular, there may be instances in which reproduction of the audio may be socially inappropriate, depending on the user's environment. Accordingly, as an initial value, a configuration in which only video data is reproduced, i.e., the audio signal is not reproduced, may be preferable; audio may be synchronized and reproduced only when an input, such as when the user clicks video data, is received.

Although smartphone ex115 was used in the above example, other implementations are conceivable: a transceiver terminal including both an encoder and a decoder; a transmitter terminal including only an encoder; and a receiver terminal including only a decoder. In the description of the digital broadcasting system, an example is given in which multiplexed data obtained as a result of video data being multiplexed with audio data is received or transmitted. The multiplexed data, however, may be video data multiplexed with data other than audio data, such as text data related to the video. Further, the video data itself rather than multiplexed data may be received or transmitted.

Although main controller ex460 including a CPU is described as controlling the encoding or decoding processes, various terminals often include GPUs. Accordingly, a configuration is acceptable in which a large area is processed at once by making use of the performance ability of the GPU via memory shared by the CPU and GPU, or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of pictures, for example, all at once.

INDUSTRIAL APPLICABILITY

The present disclosure is applicable to, for example, television receivers, digital video recorders, car navigation systems, mobile phones, digital cameras, and digital video cameras.

REFERENCE MARKINGS 100 encoder
102 splitter
104 subtractor
106 transformer
108 quantizer
110 entropy encoder
112, 204 inverse quantizer
114, 206 inverse transformer
116, 208 adder
118, 210 block memory
120, 212 loop filter
122, 214 frame memory
124, 216 intra predictor
126, 218 inter predictor
128, 220 prediction controller
200 decoder
202 entropy decoder

The invention claimed is:

1. An image decoder comprising:
circuitry; and
a memory coupled to the circuitry;
wherein the circuitry, in operation:
performs a first partitioning including using a first partition mode, without parsing first splitting information indicative of the first partition mode, to split a first block into a plurality of second blocks, wherein the first block is one of a plurality of first blocks split from a picture;
determines whether a second block, which is one of the plurality of second blocks, is located adjacent to an edge of the picture and whether dimensions of the second block satisfy a second condition;
performs a second partitioning on the second block by parsing second splitting information indicative of a second partition mode and using the second partition mode to split the second block into a plurality of coding units (CUs), wherein the second partition mode (i) prohibits a quad tree splitting of the second block in response to that the second block is located adjacent to the edge of the picture and that the dimensions of the second block satisfy the second condition, and (ii) allows the quad tree splitting of the second block in response to that the second block is not located adjacent to the edge of the picture; and
decodes the plurality of CUs.

2. The image decoder of claim 1, wherein the circuitry uses the first partition mode to split the first block in response to a first condition being satisfied.

3. The image decoder of claim 2, wherein the circuitry uses the first partition mode to split the first block in response to that the first block is located adjacent to an edge of the picture.

4. The image decoder of claim 2, wherein the circuitry uses the first partition mode to split the first block in response to that the first block has a rectangular shape.

5. The image decoder of claim 2, wherein the circuitry uses the first partition mode to split the first block in response to that dimensions of the first block satisfy the first condition.

6. The image decoder of claim 1, wherein the first partition mode allows at least one of a quad tree splitting and a binary splitting.

7. The image decoder of claim 1, wherein the second partition mode prohibits a quad tree splitting of the second block in response to that the second block has a rectangular shape.

8. The image decoder of claim 1, wherein the second splitting information indicative of the second partition mode does not include a flag indicative of the quad tree splitting.

9. The image decoder of claim 1, wherein the second splitting information indicative of the second partition mode includes at least one of a flag indicative of a binary tree splitting and a flag indicative of a ternary tree splitting.

10. The image decoder of claim 1, wherein the second splitting information indicative of the second partition mode includes information indicative of a split direction.

11. The decoder of claim 10, wherein the second splitting information indicative of the second partition mode indicates application of a binary tree splitting in a horizontal direction to the second block located adjacent to a horizontal edge of the picture.

12. An image decoder comprising:
an entropy decoder which, in operation, receives and decodes an encoded bitstream to obtain quantized transform coefficients,
an inverse quantizer and transformer which, in operation, inverse quantizes the quantized transform coefficients to obtain transform coefficients and inverse transform the transform coefficients to obtain residuals,
an adder which, in operation, adds the residuals outputted from the inverse quantizer and transformer and predictions outputted from a prediction controller to reconstruct blocks, and
the prediction controller coupled to an inter predictor, an intra predictor, and a memory, wherein the inter predictor, in operation, generates a prediction of a current block based on a reference block in a decoded reference picture; and the intra predictor, in operation, generates a prediction of a current block based on a decoded reference block in a current picture, wherein the prediction controller, the inter predictor, and the intra predictor form a predictor,
wherein the predictor, in operation,
performs a first partitioning including using a first partition mode, without parsing first splitting information indicative of the first partition mode, to split a first block into a plurality of second blocks, wherein the first block is one of a plurality of first blocks split from a picture;
determines whether a second block, which is one of the plurality of second blocks, is located adjacent to an edge of the picture and whether dimensions of the second block satisfy a second condition;
performs a second partitioning on the second block by parsing second splitting information indicative of a second partition mode and using the second partition mode to split the second block into a plurality of coding units (CUs), wherein the second partition mode (i) prohibits a quad tree splitting of the second block in response to that the second block is located adjacent to the edge of the picture and that the dimensions of the second block satisfy the second condition, and (ii) allows the quad tree splitting of the second block in response to that the second block is not located adjacent to the edge of the picture; and
decodes the plurality of CUs.

13. The image decoder of claim 12, wherein the predictor uses the first partition mode to split the first block in response to that the first block is located adjacent to an edge of the picture.

14. The image decoder of claim 12, wherein the predictor uses the first partition mode to split the first block in response to that the first block has a rectangular shape.

15. The image decoder of claim 12, wherein the predictor uses the first partition mode to split the first block in response to that dimensions of the first block satisfy a first condition.

16. A decoding method comprising:
performing a first partitioning including using a first partition mode, without parsing first splitting information indicative of the first partition mode, to split a first block into a plurality of second blocks, wherein the first block is one of a plurality of first blocks split from a picture;
determining whether a second block, which is one of the plurality of second blocks, is located adjacent to an edge of the picture and whether dimensions of the second block satisfy a second condition;
performing a second partitioning on the second block by parsing second splitting information indicative of a second partition mode and using the second partition mode to split the second block into a plurality of coding units (CUs), wherein the second partition mode (i) prohibits a quad tree splitting of the second block in response to that the second block is located adjacent to the edge of the picture and that the dimensions of the second block satisfy the second condition, and (ii) allows the quad tree splitting of the second block in response to that the second block is not located adjacent to the edge of the picture; and
decoding the plurality of CUs.

17. The method of claim 16, wherein the first partition mode is used to split the first block in response to that the first block is located adjacent to an edge of the picture.

18. The method of claim 16, wherein the first partition mode is used to split the first block in response to that the first block has a rectangular shape.

19. The method of claim 16, wherein the first partition mode allows at least one of a quad tree splitting and a binary splitting.

20. The method of claim 16, wherein the second splitting information indicative of the second partition mode includes information indicative of a split direction.

* * * * *